(12) United States Patent
Berardi et al.

(10) Patent No.: US 7,805,378 B2
(45) Date of Patent: Sep. 28, 2010

(54) SYSTEM AND METHOD FOR ENCODING INFORMATION IN MAGNETIC STRIPE FORMAT FOR USE IN RADIO FREQUENCY IDENTIFICATION TRANSACTIONS

(75) Inventors: Michael J. Berardi, Lauderhill, FL (US); Michal Bliman, Matawan, NJ (US); David S. Bonalle, New Rochelle, NY (US); Peter D. Saunders, Salt Lake City, UT (US)

(73) Assignee: American Express Travel Related Servicex Company, Inc., New York, NY (US)

( * ) Notice: Subject to any disclaimer, the term of this patent is extended or adjusted under 35 U.S.C. 154(b) by 1273 days.

(21) Appl. No.: 10/810,473

(22) Filed: Aug. 30, 2004

(65) Prior Publication Data

US 2004/0260646 A1    Dec. 23, 2004

Related U.S. Application Data

(63) Continuation-in-part of application No. 10/192,488, filed on Jul. 9, 2002, now Pat. No. 7,239,226, and a continuation-in-part of application No. 10/340,352, filed on Jan. 10, 2003.

(60) Provisional application No. 60/304,216, filed on Jul. 10, 2001, provisional application No. 60/396,577, filed on Jul. 16, 2002.

(51) Int. Cl.
    *G06Q 20/00* (2006.01)
(52) U.S. Cl. .............................. 705/67; 705/13; 705/26; 705/51; 705/78; 700/232; 709/204
(58) Field of Classification Search ............ 705/64–79, 705/13, 26, 51; 700/232; 709/204
See application file for complete search history.

(56) References Cited

U.S. PATENT DOCUMENTS 4,303,904 A    12/1981    Chasek (Continued)

FOREIGN PATENT DOCUMENTS

CH    689070 A5    8/1988

(Continued)

OTHER PUBLICATIONS

International Search Report and Written Opinion of the International Searching Authority, PCT/US05/26067, May 23, 2007.

(Continued)

*Primary Examiner*—Pierre Eddy Elisca
*Assistant Examiner*—Shahid Kamal
(74) *Attorney, Agent, or Firm*—Snell & Wilmer L.L.P.

(57) ABSTRACT

A transaction device system is associated with a transaction device proxy account identifier, which may be stored in a database on the transaction device system and may be associated with a transaction account identifier for use in completing a transaction. The proxy transaction device identifier may include at least a first portion which corresponds to a portion of the transaction device identifier. The first portion of the proxy transaction device identifier may be segmented into proxy fields where a first segment includes a portion of a transaction account data set, and a second segment has encoded therein an account provider desired information. The proxy account identifier segments are undetectable by receiving systems such that the proxy account identifier emulates a merchant recognizable data transfer format. The account provider system uses the first portion of the transaction device identifier to reassemble the transaction device identifier for use in transaction completion.

15 Claims, 10 Drawing Sheets

U.S. PATENT DOCUMENTS

| | | | |
|---|---|---|---|
| 4,443,027 A | 4/1984 | McNeely et al. | |
| 4,450,535 A | 5/1984 | de Pommery et al. | |
| 4,475,308 A | 10/1984 | Heise et al. | |
| 4,583,766 A | 4/1986 | Wessel | |
| 4,639,765 A | 1/1987 | dHont | |
| 4,672,021 A | 6/1987 | Blumel et al. | |
| 4,700,055 A | 10/1987 | Kashkashian, Jr. | |
| 4,736,094 A | 4/1988 | Yoshida | |
| 4,739,328 A | 4/1988 | Koelle et al. | |
| 4,837,422 A | 6/1989 | Dethloff et al. | |
| 4,839,504 A | 6/1989 | Nakano | |
| 4,868,849 A | 9/1989 | Tamaoki | |
| 4,961,142 A | 10/1990 | Elliott et al. | |
| 5,016,274 A | 5/1991 | Micali et al. | |
| 5,023,782 A | 6/1991 | Lutz et al. | |
| 5,023,908 A | 6/1991 | Weiss | |
| 5,025,372 A | 6/1991 | Burton et al. | |
| 5,053,774 A | 10/1991 | Schuermann et al. | |
| 5,099,226 A | 3/1992 | Andrews | |
| 5,101,200 A | 3/1992 | Swett | |
| 5,197,140 A | 3/1993 | Balmer | |
| 5,202,826 A | 4/1993 | McCarthy | |
| 5,212,777 A | 5/1993 | Gove et al. | |
| 5,221,838 A | 6/1993 | Gutman et al. | |
| 5,222,282 A | 6/1993 | Sukonnik et al. | |
| 5,226,989 A | 7/1993 | Sukonnik | |
| 5,239,654 A | 8/1993 | Ing-Simmons et al. | |
| 5,247,304 A | 9/1993 | dHont | |
| 5,274,392 A | 12/1993 | dHont et al. | |
| 5,276,311 A | 1/1994 | Hennige | |
| 5,285,100 A | 2/1994 | Byatt | |
| 5,305,002 A | 4/1994 | Holodak et al. | |
| 5,326,964 A | 7/1994 | Risser | |
| 5,329,617 A | 7/1994 | Asal | |
| 5,331,138 A | 7/1994 | Saroya | |
| 5,339,447 A | 8/1994 | Balmer | |
| 5,349,357 A | 9/1994 | Schurmann et al. | |
| 5,351,052 A | 9/1994 | dHont et al. | |
| 5,365,551 A | 11/1994 | Snodgrass et al. | |
| 5,371,896 A | 12/1994 | Gove et al. | |
| 5,373,303 A | 12/1994 | dHont | |
| 5,397,881 A | 3/1995 | Mannik | |
| 5,407,893 A | 4/1995 | Koshizuka et al. | |
| 5,408,243 A | 4/1995 | dHont | |
| 5,410,649 A | 4/1995 | Gove | |
| 5,428,363 A | 6/1995 | dHont | |
| 5,453,747 A | 9/1995 | dHont et al. | |
| 5,461,217 A | 10/1995 | Claus | |
| 5,471,592 A | 11/1995 | Gove et al. | |
| 5,485,510 A | 1/1996 | Colbert | |
| 5,488,376 A | 1/1996 | Hurta et al. | |
| 5,489,411 A | 2/1996 | Jha et al. | |
| 5,489,908 A | 2/1996 | Orthmann et al. | |
| 5,490,079 A | 2/1996 | Sharpe et al. | |
| 5,491,483 A | 2/1996 | dHont | |
| 5,491,484 A | 2/1996 | Schuermann | |
| 5,491,715 A | 2/1996 | Flaxl | |
| 5,493,312 A | 2/1996 | Knebelkamp | |
| 5,497,121 A | 3/1996 | dHont | |
| 5,500,513 A | 3/1996 | Langhans et al. | |
| 5,500,651 A | 3/1996 | Schuermann | |
| 5,504,808 A | 4/1996 | Hamrick, Jr. | |
| 5,513,525 A | 5/1996 | Schurmann | |
| 5,519,381 A | 5/1996 | Marsh et al. | |
| 5,522,083 A | 5/1996 | Gove et al. | |
| 5,525,992 A | 6/1996 | Froschermeier | |
| 5,525,994 A | 6/1996 | Hurta et al. | |
| 5,530,232 A | 6/1996 | Taylor | |
| 5,537,314 A | 7/1996 | Kanter | |
| 5,541,604 A | 7/1996 | Meier | |
| 5,543,798 A | 8/1996 | Schuermann | |
| 5,544,246 A | 8/1996 | Mandelbaum et al. | |
| 5,548,291 A | 8/1996 | Meier et al. | |
| 5,550,536 A | 8/1996 | Flaxl | |
| 5,550,548 A | 8/1996 | Schuermann | |
| 5,552,789 A | 9/1996 | Schuermann | |
| 5,557,279 A | 9/1996 | dHont | |
| 5,557,516 A | 9/1996 | Hogan | |
| 5,561,430 A | 10/1996 | Knebelkamp | |
| 5,563,582 A | 10/1996 | dHont | |
| 5,569,187 A | 10/1996 | Kaiser | |
| 5,572,226 A | 11/1996 | Tuttle | |
| 5,577,109 A | 11/1996 | Stimson et al. | |
| 5,577,120 A | 11/1996 | Penzias | |
| 5,578,808 A | 11/1996 | Taylor | |
| 5,581,630 A | 12/1996 | Bonneau, Jr. | |
| 5,585,787 A | 12/1996 | Wallerstein | |
| 5,590,038 A | 12/1996 | Pitroda | |
| 5,592,150 A | 1/1997 | dHont | |
| 5,592,405 A | 1/1997 | Gove et al. | |
| 5,594,227 A | 1/1997 | Deo | |
| 5,594,233 A | 1/1997 | Kenneth et al. | |
| 5,594,448 A | 1/1997 | dHont | |
| 5,597,534 A | 1/1997 | Kaiser | |
| 5,600,175 A | 2/1997 | Orthmann | |
| 5,602,538 A | 2/1997 | Orthmann et al. | |
| 5,602,919 A | 2/1997 | Hurta et al. | |
| 5,604,342 A | 2/1997 | Fujioka | |
| 5,606,520 A | 2/1997 | Gove et al. | |
| 5,606,594 A | 2/1997 | Register et al. | |
| 5,607,522 A | 3/1997 | McDonnell | |
| 5,608,406 A | 3/1997 | Eberth et al. | |
| 5,608,778 A | 3/1997 | Partridge, III | |
| 5,613,146 A | 3/1997 | Gove et al. | |
| 5,614,703 A | 3/1997 | Martin et al. | |
| 5,619,207 A | 4/1997 | dHont | |
| 5,621,396 A | 4/1997 | Flaxl | |
| 5,621,411 A | 4/1997 | Hagl et al. | |
| 5,621,412 A | 4/1997 | Sharpe et al. | |
| 5,625,366 A | 4/1997 | dHont | |
| 5,625,370 A | 4/1997 | dHont | |
| 5,625,695 A | 4/1997 | MRaihi et al. | |
| 5,629,981 A | 5/1997 | Nerlikar | |
| 5,638,080 A | 6/1997 | Orthmann et al. | |
| 5,640,002 A | 6/1997 | Ruppert et al. | |
| 5,641,050 A | 6/1997 | Smith et al. | |
| 5,646,607 A | 7/1997 | Schurmann et al. | |
| 5,649,118 A | 7/1997 | Carlisle et al. | |
| 5,657,388 A | 8/1997 | Weiss | |
| 5,660,319 A | 8/1997 | Falcone et al. | |
| 5,673,106 A | 9/1997 | Thompson | |
| 5,675,342 A | 10/1997 | Sharpe | |
| 5,686,920 A | 11/1997 | Hurta et al. | |
| 5,689,100 A | 11/1997 | Carrithers et al. | |
| 5,691,731 A | 11/1997 | vanErven | |
| 5,692,132 A | 11/1997 | Hogan | |
| 5,696,913 A | 12/1997 | Gove et al. | |
| 5,698,837 A | 12/1997 | Furuta | |
| 5,699,528 A | 12/1997 | Hogan | |
| 5,701,127 A | 12/1997 | Sharpe | |
| 5,704,046 A | 12/1997 | Hogan | |
| 5,705,798 A | 1/1998 | Tarbox | |
| 5,715,399 A | 2/1998 | Bezos | |
| 5,721,781 A | 2/1998 | Deo et al. | |
| 5,724,424 A | 3/1998 | Gifford | |
| 5,729,053 A | 3/1998 | Orthmann | |
| 5,729,236 A | 3/1998 | Flaxl | |
| 5,731,957 A | 3/1998 | Brennan | |
| 5,732,579 A | 3/1998 | dHont et al. | |
| 5,734,838 A | 3/1998 | Robinson et al. | |
| 5,742,756 A | 4/1998 | Dillaway et al. | |
| 5,742,845 A | 4/1998 | Wagner | |
| 5,748,137 A | 5/1998 | dHont | |
| 5,748,737 A | 5/1998 | Daggar | |

| | | | | | |
|---|---|---|---|---|---|
| 5,758,195 A | 5/1998 | Balmer | 5,918,216 A | 6/1999 | Miksovsky et al. |
| 5,761,306 A | 6/1998 | Lewis | 5,920,628 A | 7/1999 | Indeck et al. |
| 5,761,493 A | 6/1998 | Blakeley et al. | 5,923,734 A | 7/1999 | Taskett |
| 5,768,385 A | 6/1998 | Simon | 5,929,801 A | 7/1999 | Aslanidis et al. |
| 5,768,609 A | 6/1998 | Gove et al. | 5,930,767 A | 7/1999 | Reber et al. |
| 5,770,843 A | 6/1998 | Rose et al. | 5,930,777 A | 7/1999 | Barber |
| 5,774,882 A | 6/1998 | Keen et al. | 5,931,917 A | 8/1999 | Nguyen et al. |
| 5,777,903 A | 7/1998 | Piosenka | 5,933,624 A | 8/1999 | Balmer |
| 5,778,067 A | 7/1998 | Jones et al. | 5,943,624 A | 8/1999 | Fox et al. |
| 5,778,069 A | 7/1998 | Thomlinson et al. | 5,948,116 A | 9/1999 | Aslanidis et al. |
| 5,785,680 A | 7/1998 | Niezink et al. | 5,949,044 A | 9/1999 | Walker et al. |
| 5,792,337 A | 8/1998 | Padovani et al. | 5,949,876 A | 9/1999 | Ginter et al. |
| 5,793,324 A | 8/1998 | Aslanidis et al. | 5,953,512 A | 9/1999 | Cai et al. |
| 5,794,095 A | 8/1998 | Thompson | 5,953,710 A | 9/1999 | Fleming |
| 5,797,060 A | 8/1998 | Thompson | 5,955,717 A | 9/1999 | Vanstone |
| 5,797,085 A | 8/1998 | Beuk et al. | 5,955,969 A | 9/1999 | dHont |
| 5,797,133 A | 8/1998 | Jones et al. | 5,956,024 A | 9/1999 | Strickland et al. |
| 5,798,709 A | 8/1998 | Flaxl | 5,956,699 A | 9/1999 | Wong et al. |
| 5,809,142 A | 9/1998 | Hurta et al. | 5,958,004 A | 9/1999 | Helland et al. |
| 5,809,288 A | 9/1998 | Balmer | 5,960,411 A | 9/1999 | Hartman et al. |
| 5,809,633 A | 9/1998 | Mundigl et al. | 5,963,915 A | 10/1999 | Kirsch |
| 5,825,007 A | 10/1998 | Jesadanont | 5,963,924 A | 10/1999 | Williams et al. |
| 5,825,302 A | 10/1998 | Stafford | 5,966,697 A | 10/1999 | Fergerson et al. |
| 5,826,077 A | 10/1998 | Blakeley et al. | 5,970,148 A | 10/1999 | Meier |
| 5,826,241 A | 10/1998 | Stein et al. | 5,970,471 A | 10/1999 | Hill |
| 5,826,242 A | 10/1998 | Montulli | 5,970,472 A | 10/1999 | Allsop et al. |
| 5,826,243 A | 10/1998 | Musmanno et al. | 5,970,473 A | 10/1999 | Gerszberg et al. |
| 5,828,044 A | 10/1998 | Jun et al. | 5,970,475 A | 10/1999 | Barnes et al. |
| 5,834,756 A | 11/1998 | Gutman et al. | RE36,365 E | 11/1999 | Levine et al. |
| 5,835,894 A | 11/1998 | Adcock et al. | 5,978,840 A | 11/1999 | Nguyen et al. |
| 5,841,364 A | 11/1998 | Hagl et al. | 5,979,757 A | 11/1999 | Tracy et al. |
| 5,842,088 A | 11/1998 | Thompson | 5,982,293 A | 11/1999 | Everett et al. |
| 5,844,218 A | 12/1998 | Kawan et al. | 5,983,207 A | 11/1999 | Turk et al. |
| 5,844,230 A | 12/1998 | Lalonde | 5,983,208 A | 11/1999 | Haller et al. |
| 5,845,267 A | 12/1998 | Ronen | 5,987,140 A | 11/1999 | Rowney et al. |
| 5,851,149 A | 12/1998 | Xidos et al. | 5,987,155 A | 11/1999 | Dunn et al. |
| 5,852,812 A | 12/1998 | Reeder | 5,987,498 A | 11/1999 | Athing et al. |
| 5,854,891 A | 12/1998 | Postlewaite et al. | 5,989,950 A | 11/1999 | Wu |
| 5,858,006 A | 1/1999 | Van der AA et al. | 5,991,413 A | 11/1999 | Arditti et al. |
| 5,859,419 A | 1/1999 | Wynn | 5,991,608 A | 11/1999 | Leyten |
| 5,859,779 A | 1/1999 | Giordano et al. | 5,991,748 A | 11/1999 | Taskett |
| 5,862,325 A | 1/1999 | Reed et al. | 5,991,750 A | 11/1999 | Watson |
| 5,864,306 A | 1/1999 | Dwyer et al. | 5,996,076 A | 11/1999 | Rowney et al. |
| 5,864,323 A | 1/1999 | Berthon | 5,999,914 A | 12/1999 | Blinn et al. |
| 5,864,830 A | 1/1999 | Armetta et al. | 6,000,832 A | 12/1999 | Franklin et al. |
| 5,867,100 A | 2/1999 | dHont | 6,002,438 A | 12/1999 | Hocevar et al. |
| 5,870,031 A | 2/1999 | Kaiser et al. | 6,002,767 A | 12/1999 | Kramer |
| 5,870,915 A | 2/1999 | dHont | 6,003,014 A | 12/1999 | Lee et al. |
| 5,878,138 A | 3/1999 | Yacobi | 6,005,942 A | 12/1999 | Chan et al. |
| 5,878,141 A | 3/1999 | Daly et al. | 6,006,216 A | 12/1999 | Griffin et al. |
| 5,878,215 A | 3/1999 | Kling et al. | 6,009,412 A | 12/1999 | Storey |
| 5,878,337 A | 3/1999 | Joao et al. | 6,011,487 A | 1/2000 | Plocher |
| 5,878,403 A | 3/1999 | DeFrancesco et al. | 6,012,039 A | 1/2000 | Hoffman et al. |
| 5,880,675 A | 3/1999 | Trautner | 6,012,049 A | 1/2000 | Kawan |
| 5,881,272 A | 3/1999 | Balmer | 6,012,143 A | 1/2000 | Tanaka |
| 5,883,810 A * | 3/1999 | Franklin et al. ............. 700/232 | 6,012,636 A | 1/2000 | Smith |
| 5,884,280 A | 3/1999 | Yoshioka et al. | 6,014,634 A | 1/2000 | Scroggie et al. |
| 5,887,266 A | 3/1999 | Heinonen et al. | 6,014,635 A | 1/2000 | Harris et al. |
| 5,890,137 A | 3/1999 | Koreeda | 6,014,636 A | 1/2000 | Reeder |
| 5,897,622 A | 4/1999 | Blinn et al. | 6,014,645 A | 1/2000 | Cunningham |
| 5,898,783 A | 4/1999 | Rohrbach | 6,014,646 A | 1/2000 | Vallee et al. |
| 5,898,838 A | 4/1999 | Wagner | 6,014,648 A | 1/2000 | Brennan |
| 5,903,830 A | 5/1999 | Joao et al. | 6,014,650 A | 1/2000 | Zampese |
| 5,903,875 A | 5/1999 | Kohara | 6,014,748 A | 1/2000 | Tushi et al. |
| 5,903,880 A | 5/1999 | Biffar | 6,016,482 A | 1/2000 | Molinari et al. |
| 5,905,798 A | 5/1999 | Nerlikar et al. | 6,016,484 A | 1/2000 | Williams et al. |
| 5,905,908 A | 5/1999 | Wagner | 6,018,717 A | 1/2000 | Lee et al. |
| 5,909,492 A | 6/1999 | Payne et al. | 6,018,718 A | 1/2000 | Walker et al. |
| 5,912,678 A | 6/1999 | Saxena et al. | 6,021,943 A | 2/2000 | Chastain |
| 5,913,203 A | 6/1999 | Wong et al. | 6,023,510 A | 2/2000 | Epstein |
| 5,914,472 A | 6/1999 | Foladare et al. | 6,024,286 A | 2/2000 | Bradley et al. |
| 5,915,023 A | 6/1999 | Bernstein | 6,029,147 A | 2/2000 | Horadan et al. |
| 5,917,168 A | 6/1999 | Nakamura et al. | 6,029,149 A | 2/2000 | Dykstra et al. |

| | | | | | | | |
|---|---|---|---|---|---|---|---|
| 6,029,150 | A | 2/2000 | Kravitz | 6,206,293 | B1 | 3/2001 | Gutman et al. |
| 6,029,890 | A | 2/2000 | Austin | 6,213,390 | B1 | 4/2001 | Oneda |
| 6,029,892 | A | 2/2000 | Miyake | 6,215,437 | B1 | 4/2001 | Schurmann et al. |
| 6,032,136 | A | 2/2000 | Brake et al. | 6,216,219 | B1 | 4/2001 | Cai et al. |
| 6,038,292 | A | 3/2000 | Thomas | 6,219,439 | B1 | 4/2001 | Burger |
| 6,038,551 | A | 3/2000 | Barlow et al. | 6,220,510 | B1 | 4/2001 | Everett et al. |
| 6,038,584 | A | 3/2000 | Balmer | 6,222,914 | B1 | 4/2001 | McMullin |
| 6,041,308 | A | 3/2000 | Walker et al. | D442,627 | S | 5/2001 | Webb et al. |
| 6,044,360 | A | 3/2000 | Picciallo | D442,629 | S | 5/2001 | Webb et al. |
| 6,047,888 | A | 4/2000 | Dethloff | 6,223,984 | B1 | 5/2001 | Renner et al. |
| 6,052,675 | A | 4/2000 | Checchio | 6,226,382 | B1 | 5/2001 | MRaihi et al. |
| 6,058,418 | A | 5/2000 | Kobata | 6,227,447 | B1 | 5/2001 | Campisano |
| 6,061,344 | A | 5/2000 | Wood, Jr. | 6,230,270 | B1 | 5/2001 | Laczko, Sr. |
| 6,061,789 | A | 5/2000 | Hauser et al. | 6,232,917 | B1 | 5/2001 | Baumer et al. |
| 6,064,320 | A | 5/2000 | dHont et al. | 6,233,230 | B1 | 5/2001 | Chan et al. |
| 6,064,981 | A | 5/2000 | Barni et al. | 6,233,683 | B1 | 5/2001 | Chan et al. |
| 6,067,529 | A * | 5/2000 | Ray et al. ..................... 705/26 | 6,237,848 | B1 | 5/2001 | Everett |
| 6,070,003 | A | 5/2000 | Gove et al. | 6,239,675 | B1 | 5/2001 | Flaxl |
| 6,070,150 | A | 5/2000 | Remington et al. | 6,240,187 | B1 | 5/2001 | Lewis |
| 6,070,154 | A | 5/2000 | Tavor et al. | 6,248,199 | B1 | 6/2001 | Smulson |
| 6,072,870 | A | 6/2000 | Nguyen et al. | 6,257,486 | B1 | 7/2001 | Teicher et al. |
| 6,073,840 | A | 6/2000 | Marion | 6,259,769 | B1 | 7/2001 | Page |
| 6,076,078 | A | 6/2000 | Camp et al. | 6,260,026 | B1 | 7/2001 | Tomida et al. |
| 6,078,888 | A | 6/2000 | Johnson, Jr. | 6,260,088 | B1 | 7/2001 | Gove et al. |
| 6,078,906 | A | 6/2000 | Huberman | 6,263,316 | B1 * | 7/2001 | Khan et al. ................... 705/13 |
| 6,078,908 | A | 6/2000 | Schmitz | 6,264,106 | B1 | 7/2001 | Bridgelall |
| 6,081,790 | A | 6/2000 | Rosen | 6,266,754 | B1 | 7/2001 | Laczko, Sr. et al. |
| RE36,788 | E | 7/2000 | Mansvelt et al. | 6,267,292 | B1 | 7/2001 | Walker et al. |
| 6,088,683 | A | 7/2000 | Jalili | 6,269,348 | B1 | 7/2001 | Pare et al. |
| 6,088,686 | A | 7/2000 | Walker et al. | 6,273,335 | B1 | 8/2001 | Sloan |
| 6,088,717 | A | 7/2000 | Reed et al. | 6,282,522 | B1 | 8/2001 | Davis et al. |
| 6,088,797 | A | 7/2000 | Rosen | D447,515 | S | 9/2001 | Faenza, Jr. et al. |
| 6,092,057 | A | 7/2000 | Zimmerman et al. | 6,286,763 | B1 | 9/2001 | Reynolds et al. |
| 6,092,198 | A | 7/2000 | Lanzy et al. | 6,289,324 | B1 | 9/2001 | Kawan |
| 6,098,053 | A | 8/2000 | Slater | 6,293,462 | B1 | 9/2001 | Gangi |
| 6,098,879 | A | 8/2000 | Terranova | 6,315,193 | B1 | 11/2001 | Hogan |
| 6,101,174 | A | 8/2000 | Langston | 6,315,195 | B1 | 11/2001 | Ramachandran |
| 6,102,162 | A | 8/2000 | Teicher | 6,317,721 | B1 | 11/2001 | Hurta et al. |
| 6,102,672 | A | 8/2000 | Woollenweber | 6,318,636 | B1 | 11/2001 | Reynolds et al. |
| 6,105,008 | A | 8/2000 | Davis et al. | 6,323,566 | B1 | 11/2001 | Meier |
| 6,105,013 | A | 8/2000 | Curry et al. | 6,325,285 | B1 | 12/2001 | Baratelli |
| 6,105,865 | A | 8/2000 | Hardesty | 6,325,293 | B1 | 12/2001 | Moreno |
| 6,108,641 | A | 8/2000 | Kenna et al. | 6,326,934 | B1 | 12/2001 | Kinzie |
| 6,109,525 | A | 8/2000 | Blomqvist et al. | 6,327,573 | B1 | 12/2001 | Walker et al. |
| 6,112,152 | A | 8/2000 | Tuttle | 6,330,544 | B1 | 12/2001 | Walker et al. |
| 6,112,191 | A | 8/2000 | Burke | 6,336,095 | B1 | 1/2002 | Rosen |
| 6,115,360 | A | 9/2000 | Quay et al. | 6,342,844 | B1 | 1/2002 | Rozin |
| 6,115,458 | A | 9/2000 | Taskett | 6,353,811 | B1 | 3/2002 | Weissman |
| 6,116,423 | A | 9/2000 | Troxtell, Jr. et al. | 6,364,208 | B1 | 4/2002 | Stanford et al. |
| 6,116,505 | A | 9/2000 | Withrow | 6,367,011 | B1 | 4/2002 | Lee et al. |
| 6,118,189 | A | 9/2000 | Flaxl | 6,374,245 | B1 | 4/2002 | Park |
| 6,121,544 | A | 9/2000 | Petsinger | 6,377,034 | B1 | 4/2002 | Ivanov |
| 6,122,625 | A | 9/2000 | Rosen | 6,378,073 | B1 | 4/2002 | Davis et al. |
| 6,123,223 | A | 9/2000 | Watkins | 6,388,533 | B2 | 5/2002 | Swoboda |
| 6,125,352 | A | 9/2000 | Franklin et al. | 6,390,375 | B2 | 5/2002 | Kayanakis |
| 6,129,274 | A | 10/2000 | Suzuki | 6,400,272 | B1 | 6/2002 | Holtzman et al. |
| 6,133,834 | A | 10/2000 | Eberth et al. | 6,402,026 | B1 | 6/2002 | Schwier |
| 6,141,651 | A | 10/2000 | Riley et al. | 6,402,028 | B1 | 6/2002 | Graham, Jr. et al. |
| 6,141,752 | A | 10/2000 | Dancs et al. | 6,411,611 | B1 | 6/2002 | Van der Tuijn |
| 6,163,771 | A | 12/2000 | Walker et al. | 6,415,978 | B1 | 7/2002 | McAllister |
| 6,167,236 | A | 12/2000 | Kaiser et al. | 6,422,464 | B1 | 7/2002 | Terranova |
| 6,173,269 | B1 | 1/2001 | Sokol et al. | 6,424,029 | B1 | 7/2002 | Giesler |
| 6,173,272 | B1 * | 1/2001 | Thomas et al. ................. 705/42 | RE37,822 | E | 8/2002 | Anthonyson |
| 6,177,860 | B1 | 1/2001 | Cromer et al. | 6,427,910 | B1 | 8/2002 | Barnes et al. |
| 6,179,205 | B1 | 1/2001 | Sloan | 6,438,235 | B2 | 8/2002 | Sims, III |
| 6,179,206 | B1 | 1/2001 | Matsumori | 6,439,455 | B1 | 8/2002 | Everett et al. |
| 6,188,994 | B1 | 2/2001 | Egendorf | 6,442,532 | B1 | 8/2002 | Kawan |
| 6,189,787 | B1 | 2/2001 | Dorf | 6,445,794 | B1 | 9/2002 | Shefi |
| 6,192,255 | B1 | 2/2001 | Lewis et al. | 6,457,996 | B1 | 10/2002 | Shih |
| 6,198,728 | B1 | 3/2001 | Hulyalkar et al. | 6,466,804 | B1 | 10/2002 | Pecen et al. |
| 6,198,875 | B1 | 3/2001 | Edenson et al. | 6,473,500 | B1 | 10/2002 | Risafi et al. |
| 6,202,927 | B1 | 3/2001 | Bashan et al. | 6,480,100 | B1 | 11/2002 | Frieden et al. |
| 6,205,151 | B1 | 3/2001 | Quay et al. | 6,480,101 | B1 | 11/2002 | Kelly et al. |

| | | | | | | |
|---|---|---|---|---|---|---|
| 6,481,621 B1 | 11/2002 | Herrendoerfer et al. | | 7,340,438 B2 * | 3/2008 | Nordman et al. ............... 705/64 |
| 6,481,632 B2 | 11/2002 | Wentker et al. | | 2001/0013542 A1 | 8/2001 | Horowitz et al. |
| 6,483,427 B1 | 11/2002 | Werb | | 2001/0024157 A1 | 9/2001 | Hansmann et al. |
| 6,483,477 B1 | 11/2002 | Plonka | | 2001/0034565 A1 | 10/2001 | Leatherman |
| 6,483,929 B1 | 11/2002 | Murakami | | 2001/0034720 A1 | 10/2001 | Armes |
| 6,484,937 B1 | 11/2002 | Devaux et al. | | 2001/0039617 A1 | 11/2001 | Buhrlen et al. |
| 6,490,443 B1 | 12/2002 | Freeny, Jr. | | 2001/0049628 A1 | 12/2001 | Icho |
| 6,491,229 B1 | 12/2002 | Berney | | 2002/0011519 A1 | 1/2002 | Shults |
| 6,494,380 B2 | 12/2002 | Jarosz | | 2002/0026419 A1 | 2/2002 | Maritzen et al. |
| 6,507,762 B1 | 1/2003 | Amro et al. | | 2002/0028704 A1 | 3/2002 | Bloomfield et al. |
| 6,510,983 B2 | 1/2003 | Horowitz et al. | | 2002/0035548 A1 | 3/2002 | Hogan et al. |
| 6,510,998 B1 | 1/2003 | Stanford et al. | | 2002/0046341 A1 | 4/2002 | Kazaks et al. |
| 6,513,015 B2 | 1/2003 | Ogasawara | | 2002/0052839 A1 | 5/2002 | Takatori |
| 6,519,565 B1 | 2/2003 | Clements et al. | | 2002/0062284 A1 | 5/2002 | Kawan |
| 6,520,542 B2 | 2/2003 | Thompson et al. | | 2002/0074398 A1 | 6/2002 | Lancos et al. |
| 6,529,880 B1 | 3/2003 | McKeen et al. | | 2002/0077837 A1 | 6/2002 | Krueger et al. |
| 6,535,726 B1 | 3/2003 | Johnson | | 2002/0077895 A1 | 6/2002 | Howell |
| 6,546,373 B1 | 4/2003 | Cerra | | 2002/0077992 A1 | 6/2002 | Tobin |
| 6,547,133 B1 | 4/2003 | DeVries, Jr. et al. | | 2002/0079367 A1 | 6/2002 | Montani |
| 6,549,912 B1 | 4/2003 | Chen | | 2002/0092914 A1 | 7/2002 | Pentz et al. |
| 6,560,581 B1 | 5/2003 | Fox et al. | | 2002/0095298 A1 * | 7/2002 | Ewing ........................... 705/1 |
| 6,577,229 B1 | 6/2003 | Bonneau et al. | | 2002/0095343 A1 | 7/2002 | Barton et al. |
| 6,578,768 B1 | 6/2003 | Binder et al. | | 2002/0095389 A1 | 7/2002 | Gaines |
| 6,581,839 B1 | 6/2003 | Lasch et al. | | 2002/0095587 A1 | 7/2002 | Doyle et al. |
| 6,587,835 B1 | 7/2003 | Treyz et al. | | 2002/0097144 A1 | 7/2002 | Collins et al. |
| 6,588,660 B1 | 7/2003 | Buescher et al. | | 2002/0107007 A1 | 8/2002 | Gerson |
| 6,589,119 B1 | 7/2003 | Orus et al. | | 2002/0107742 A1 | 8/2002 | Magill |
| 6,598,024 B1 | 7/2003 | Walker et al. | | 2002/0109580 A1 | 8/2002 | Shreve et al. |
| 6,609,655 B1 | 8/2003 | Harrell | | 2002/0111210 A1 | 8/2002 | Luciano, Jr. et al. |
| 6,623,039 B2 | 9/2003 | Thompson et al. | | 2002/0111917 A1 | 8/2002 | Hoffman et al. |
| 6,626,356 B2 | 9/2003 | Davenport et al. | | 2002/0113082 A1 | 8/2002 | Leatherman et al. |
| 6,628,961 B1 | 9/2003 | Ho et al. | | 2002/0116274 A1 | 8/2002 | Hind et al. |
| 6,636,833 B1 | 10/2003 | Flitcroft et al. | | 2002/0120584 A1 | 8/2002 | Hogan et al. |
| 6,650,887 B2 | 11/2003 | McGregor et al. | | 2002/0126010 A1 | 9/2002 | Trimble et al. |
| 6,662,166 B2 | 12/2003 | Pare et al. | | 2002/0131567 A1 | 9/2002 | Maginas |
| 6,665,405 B1 | 12/2003 | Lenstra | | 2002/0138438 A1 | 9/2002 | Bardwell |
| 6,669,086 B2 | 12/2003 | Abdi et al. | | 2002/0140542 A1 | 10/2002 | Prokoski et al. |
| 6,671,358 B1 | 12/2003 | Seidman et al. | | 2002/0145043 A1 | 10/2002 | Challa et al. |
| 6,674,786 B1 | 1/2004 | Nakamura et al. | | 2002/0147913 A1 | 10/2002 | Lun Yip |
| 6,675,153 B1 * | 1/2004 | Cook et al. .................... 705/74 | | 2002/0148892 A1 | 10/2002 | Bardwell |
| 6,679,427 B1 | 1/2004 | Kuroiwa | | 2002/0152123 A1 | 10/2002 | Giordano et al. |
| 6,681,328 B1 | 1/2004 | Harris et al. | | 2002/0154795 A1 | 10/2002 | Lee et al. |
| 6,684,269 B2 | 1/2004 | Wagner | | 2002/0166891 A1 | 11/2002 | Stoutenburg et al. |
| 6,687,714 B1 | 2/2004 | Kogen et al. | | 2002/0174067 A1 | 11/2002 | Hoffman et al. |
| 6,690,930 B1 | 2/2004 | Dupre | | 2002/0176522 A1 | 11/2002 | Fan |
| 6,693,513 B2 | 2/2004 | Tuttle | | 2002/0178063 A1 | 11/2002 | Gravelle et al. |
| 6,705,530 B2 | 3/2004 | Kiekhaefer | | 2002/0178369 A1 | 11/2002 | Black |
| 6,711,262 B1 | 3/2004 | Vatanen | | 2002/0185543 A1 | 12/2002 | Pentz et al. |
| 6,732,936 B1 | 5/2004 | Kiekhaefer | | 2002/0188501 A1 | 12/2002 | Lefkowith |
| 6,742,120 B1 | 5/2004 | Markakis et al. | | 2002/0190125 A1 | 12/2002 | Stockhammer |
| 6,747,546 B1 | 6/2004 | Hikita et al. | | 2002/0194303 A1 | 12/2002 | Suila et al. |
| 6,760,581 B2 | 7/2004 | Dutta | | 2002/0194503 A1 | 12/2002 | Faith et al. |
| 6,769,718 B1 | 8/2004 | Warther et al. | | 2002/0196963 A1 | 12/2002 | Bardwell |
| 6,789,012 B1 | 9/2004 | Childs et al. | | 2003/0009382 A1 | 1/2003 | DArbeloff et al. |
| 6,834,270 B1 | 12/2004 | Pagani et al. | | 2003/0014307 A1 | 1/2003 | Heng |
| 6,851,617 B2 | 2/2005 | Saint et al. | | 2003/0014357 A1 | 1/2003 | Chrisekos et al. |
| 6,853,087 B2 | 2/2005 | Neuhaus et al. | | 2003/0014891 A1 | 1/2003 | Nelms et al. |
| 6,853,894 B2 | 2/2005 | Kolls | | 2003/0018532 A1 | 1/2003 | Dudek et al. |
| 6,853,987 B1 * | 2/2005 | Cook ........................... 705/75 | | 2003/0018567 A1 | 1/2003 | Flitcroft et al. |
| 6,857,566 B2 | 2/2005 | Wankmueller | | 2003/0025600 A1 | 2/2003 | Blanchard |
| 6,859,672 B2 | 2/2005 | Roberts et al. | | 2003/0028481 A1 | 2/2003 | Flitcroft et al. |
| 6,895,310 B1 | 5/2005 | Kolls | | 2003/0046228 A1 | 3/2003 | Berney |
| 6,957,199 B1 * | 10/2005 | Fisher ........................... 705/78 | | 2003/0054836 A1 | 3/2003 | Michot |
| 6,968,317 B1 * | 11/2005 | Wallace et al. ............ 705/36 R | | 2003/0055727 A1 | 3/2003 | Walker et al. |
| 6,994,262 B1 | 2/2006 | Warther | | 2003/0057226 A1 | 3/2003 | Long |
| 7,003,501 B2 * | 2/2006 | Ostroff ........................... 705/76 | | 2003/0057278 A1 | 3/2003 | Wong |
| 7,020,685 B1 * | 3/2006 | Chen et al. ................... 709/204 | | 2003/0069828 A1 | 4/2003 | Blazey et al. |
| 7,069,444 B2 | 6/2006 | Lowensohn et al. | | 2003/0069846 A1 | 4/2003 | Marcon |
| 7,096,204 B1 * | 8/2006 | Chen et al. ................... 705/74 | | 2003/0112972 A1 | 6/2003 | Hattick et al. |
| 7,100,821 B2 | 9/2006 | Rasti | | 2003/0120554 A1 | 6/2003 | Hogan et al. |
| 7,103,575 B1 | 9/2006 | Linehan | | 2003/0121969 A1 | 7/2003 | Wankmueller |
| 7,136,835 B1 | 11/2006 | Flitcroft et al. | | 2003/0130820 A1 | 7/2003 | Lane, III |
| 7,213,748 B2 * | 5/2007 | Tsuei et al. ................... 235/380 | | 2003/0132284 A1 | 7/2003 | Reynolds et al. |

| | | | |
|---|---|---|---|
| 2003/0140228 A1 | 7/2003 | Binder |
| 2003/0163699 A1 | 8/2003 | Pailles et al. |
| 2003/0167207 A1 | 9/2003 | Berardi et al. |
| 2003/0177347 A1 | 9/2003 | Schneier et al. |
| 2003/0183689 A1 | 10/2003 | Swift et al. |
| 2003/0183699 A1 | 10/2003 | Masui |
| 2003/0187786 A1 | 10/2003 | Swift et al. |
| 2003/0187787 A1 | 10/2003 | Freund |
| 2003/0187790 A1 | 10/2003 | Swift et al. |
| 2003/0187796 A1 | 10/2003 | Swift et al. |
| 2003/0195037 A1 | 10/2003 | Vuong et al. |
| 2003/0195842 A1 | 10/2003 | Reece |
| 2003/0195843 A1 | 10/2003 | Matsuda et al. |
| 2003/0200184 A1 | 10/2003 | Dominguez et al. |
| 2003/0218066 A1 | 11/2003 | Fernandes et al. |
| 2003/0220876 A1 | 11/2003 | Burger et al. |
| 2003/0222153 A1 | 12/2003 | Pentz et al. |
| 2003/0225623 A1 | 12/2003 | Wankmueller |
| 2003/0225713 A1 | 12/2003 | Atkinson et al. |
| 2003/0227550 A1 | 12/2003 | Manico et al. |
| 2003/0233334 A1 | 12/2003 | Smith |
| 2004/0006539 A1 | 1/2004 | Royer et al. |
| 2004/0010462 A1 | 1/2004 | Moon et al. |
| 2004/0015451 A1 | 1/2004 | Sahota et al. |
| 2004/0016796 A1 | 1/2004 | Hanna et al. |
| 2004/0020982 A1 | 2/2004 | Hoffman et al. |
| 2004/0029569 A1 | 2/2004 | Khan et al. |
| 2004/0039814 A1 | 2/2004 | Crabtree et al. |
| 2004/0039860 A1 | 2/2004 | Mills et al. |
| 2004/0044627 A1 | 3/2004 | Russell et al. |
| 2004/0083184 A1 | 4/2004 | Tsuei et al. |
| 2004/0139021 A1 | 7/2004 | Reed et al. |
| 2005/0033659 A1* | 2/2005 | Zucker et al. .............. 705/26 |
| 2005/0038718 A1 | 2/2005 | Barnes et al. |
| 2005/0040272 A1 | 2/2005 | Argumedo et al. |
| 2005/0119978 A1 | 6/2005 | Ates |
| 2005/0121512 A1 | 6/2005 | Wankmueller |

FOREIGN PATENT DOCUMENTS

| | | |
|---|---|---|
| EP | 0 358 525 A2 | 3/1990 |
| EP | 0 424 726 A1 | 5/1991 |
| EP | 0 484 726 A1 | 5/1992 |
| EP | 0 933 717 A2 | 8/1999 |
| EP | 0 956 818 A1 | 11/1999 |
| EP | 0 959 440 A2 | 11/1999 |
| EP | 0 984 404 A2 | 3/2000 |
| EP | 1 016 947 A2 | 7/2000 |
| EP | 1 039 403 A2 | 9/2000 |
| EP | 1 104 909 A2 | 6/2001 |
| EP | 1 113 387 A2 | 7/2001 |
| EP | 1 115 095 A2 | 7/2001 |
| EP | 1 199 684 A2 | 4/2002 |
| EP | 1 251 450 A1 | 10/2002 |
| GB | 2 347 537 A | 9/2000 |
| GB | 2 361 790 A | 10/2001 |
| JP | 2000011109 A | 1/2000 |
| JP | 2000015288 A | 1/2000 |
| JP | 2000040181 A | 2/2000 |
| JP | 2000067312 A | 3/2000 |
| JP | 2000207641 A | 7/2000 |
| JP | 2001005931 A | 1/2001 |
| JP | 2001283122 A | 10/2001 |
| WO | 95/32919 A1 | 12/1995 |
| WO | 97/009688 A3 | 3/1997 |
| WO | 99/003057 A1 | 1/1999 |
| WO | 99/049424 A1 | 9/1999 |
| WO | 00/10144 A1 | 2/2000 |
| WO | 00/38088 A1 | 6/2000 |
| WO | 00/49586 A1 | 8/2000 |
| WO | 01/04825 A1 | 1/2001 |
| WO | 01/15098 A1 | 3/2001 |
| WO | 01/43095 A2 | 6/2001 |
| WO | 01/72224 A1 | 10/2001 |
| WO | 01/77856 A1 | 10/2001 |
| WO | 01/80473 A2 | 10/2001 |
| WO | 01/86535 A1 | 11/2001 |
| WO | 01/90962 A1 | 11/2001 |
| WO | 01/95243 A2 | 12/2001 |
| WO | 02/01485 A1 | 1/2002 |
| WO | 02/13134 A2 | 2/2002 |
| WO | 02/21903 A1 | 3/2002 |
| WO | 02/063545 A2 | 8/2002 |
| WO | 02/065246 A3 | 8/2002 |
| WO | 02/065404 A2 | 8/2002 |
| WO | 02/069221 A1 | 9/2002 |
| WO | 02/073512 A1 | 9/2002 |
| WO | 02/086665 A2 | 10/2002 |
| WO | 02/091281 A2 | 11/2002 |
| WO | 02/097575 A2 | 12/2002 |
| WO | 02/101670 A2 | 12/2002 |
| WO | 03/007623 A3 | 1/2003 |

OTHER PUBLICATIONS

"Credit Card Offer Travelers New Benefit", PR Newswire, Aug. 05, 1987.

"Fingerprint Analysis—The Basics", http://www.crimtrac.gov.au/fingerprintanalysis.htm, Feb. 18, 2004, 3 pages.

"Fingerprint Technology—Identix Inc.—Empowering Identification™—Understanding Biometrics", http://www.identix.com/newsroom/news_biometrics_finger.html, Feb. 18, 2004, 1 page.

"Individual Biometric—Facial Recognition", http://ctl.ncsc.dni.us/biomet%20web/Bmfacial.html, Feb. 18, 2004, 2 pages.

"Individual Biometric—Fingerprint", http://ctl.ncsc.dni.us/biomet%20web/BMFingerprint.html, Feb. 18, 2004, 3 pages.

"Individual Biometric—Hand Geometry", http://ctl.ncsc.dni.us/biomet%20web/BMHand.html, Feb. 18, 2004, 2 pages.

"Individual Biometric—Iris Scan", http://ctl.ncsc.dni.us/biomet%20web/BMIris.html, Feb. 18, 2004, 2 pages.

"Individual Biometric—Retinal Scan", http://ctl.ncsc.dni.us/biomet%20web/BMRetinal.html, Feb. 18, 2004, 2 pages.

"Individual Biometric—Vascular Patterns", http://ctl.ncsc.dni.us/biomet%20web/BMVascular.html, Feb. 18, 2004, 1 page.

"Inside's Next-Gen Smart Card: The French company plans to introduce an RFID card that uses a 16-bit microprocessor and new encryption technology", RFID Journal, Oct. 29, 2002.

"International Biometric Group—Signature Biometrics: How it Works", http://www.ibgweb.com/reports/public/reports/signature-scan_tech.html, Feb. 18, 2004, 1 page.

"International Biometric Group—Voice Recognition Technology: How It Works", http://www.ibgweb.com/reports/public/reports/voice-scan_tech.html, Feb. 18, 2004, 1 page.

"ISO Magnetic Strip Card Standards", http://www.cyberd.co.uk/support/technotes/isocards.htm, Feb. 9, 2004, 4 pages.

"Japan Gets Digital Ticket System: A national ticket seller and phone company are teaming up to create an electronic-ticket network", RFID Journal, Aug. 21, 2002.

"Making RFID Payments Ubiquitous: Philips and Visa want people to be able to pay for goods and services anywhere by using RFID chips embedded in phones and other devices", RFID Journal, Jun. 2, 2003.

"MasterCard to Test RFID Card: Pilot will test whether consumers, merchants and credit card issuers value "contactless" payments", RFID Journal, Dec. 20, 2002.

"Microsoft Launches Smart Personal Object Technology Initiative", Press Release from COMDEX Fall 2002, http://www.Microsoft.com/presspass/features/2002/nov02/11-17SPOT.asp, Nov. 17, 2002, 4 pages.

"Mobile Speedpass Goes Global as Mobil Singapore Rolls Out Asia's First RFID-Based Pay-At-The-Pump System", http://www.ti.com/tiris/docs/news_releases/rel12.htm, Apr. 05, 1999, Press Release.

"Multiple Frequency Transponders: Volume production of dual-band FRID chips begins", Frontline Solutions, Jul. 19, 2003.

"New Evidence about Positive Three-Tier Co-pay Performance Presented at Express Scripts 2000 Outcomes Conference", PR Newswire Association, Inc., Jun. 28, 2000.
"Pay by Touch—Press Releases", http://www.paybytouch.com/press/html, Feb. 10, 2004, 3 pages.
"Paying It By Ear", The Guardian http://money.guardian.co.uk/creditanddebt/creditcards/story/0,1456,876908,00.html, Jan. 18, 2003, 3 pages.
"PowerPay RFID Payment and Marketing Solution Speeds Purchases at Seahawks Stadium with Technology from Texas Instruments", http://www.powerpayit.com/news/Seahawks_pr.html, Feb. 9, 2004, 20 pages.
"Prestige Credit Cards: Those Pricey Plastics", Changing Times, Apr. 1986.
Security for Wireless Java: NTRU, a startup that offers security software, has released a Java version of its NTRU encryption algorithm, RFID Journal, Jun. 27, 2002.
"Shell Introduces Optional Credit Card", The Associated Press, Sep. 3, 1985.
"Shell Introducing Expanded 'Signature' Credit Card", Tulsa Business Chronicle, Sep. 5, 1985.
"Shell-Oil: Introduces Shell Signature Travel and Entertainment Credit Card", Business Wire, Sep. 3, 1985.
"Smart Card Developer's Kit: Some Basic Standards for Smart Card", http://unix.be.eu.org/docs/smart-card-developer-kit/ch03/033-035.html, Feb. 9, 2004, 2 pages.
"Sony, Philips Creating RFID Link: Consumer electronics giants are jointly developing a new RFID standard for payments and for communication between devices", RFID Journal, Sep. 17, 2002.
"Speedpass Unleashed", http://www.cardweb.com/cardtrak/news/cf2_20a_97/html, Jun. 04, 2002, 2 pages.
"The Chase Manhattan Bank Today Announced a Comprehensive Program to Enhance the Value of All its Credit Cards", PR Newswire, Dec. 18, 1986.
"TI Embraces Prox Card Standard: Texas instrument's ISO 14443 payment platform promises faster data transfer rates and more security", RFID Journal, Mar. 06, 2003.
"Vendors Target Amusement Parks: Protecting children and enabling cashless payments make RFID an appealing option for the entertainment industry", RFID Journal, Nov. 27, 2002.
American Express to offer disposable credit card numbers, CNN.com. U.S. News, www.cnn.com/2000/US/09/08/online.payments.ap/, Sep. 08, 2000.
Bank Extends RFID Payment Pilot: Bank of America will continue to test its QuickWave RFID payment card for another three months, RFID Journal, Jan. 23, 2003.
Bonsor, "How Facial Recognition Systems Work", http://computer.howstuffworks.com/facial-recognition.htm/printable, Feb. 18, 2004, 6 pages.
Bowman, "Everything You Need to Know About Biometrics", Identix Corporation, Jan. 2008, 8 pages.
Brewin, Bob, "Magic Wands' to Speed Mobile Sales", http://www.computerworld.com/mobiletopics/mobile/story/1,10801,563300.html, Jan. 15, 2001.
Carey, Gordon, "Multi-tier Copay", Pharmaceutical Executive, Feb. 2000.
Crumbaugh, Darlene M., "Effective Marketing Positions: Check card as consumer lifeline", Hoosier Banker, Apr. 1998, p. 10, vol. 82, Issue 4.
Disposable Credit Card Numbers, courtesy of CardRatings.org, The Dollar Stretcher, www.stretcher.com/stories/01/010212e.cfm, Jan. 2001.
Docmemory, RFID Takes Priority With Wal-Mart, http://www.sim-mtester.com/page/news/shownews.asp?num=6650, Feb. 09, 2004, 2 pages.
Evers, "Judge Dismisses FTC Suite Against Rambus", IDG New Service, http://www.infoworld.com/article/04/02/18/HNjudgedismisses_1.html, Feb. 18, 2004, 3 pages.
Functional Specification, Standard Card IC MF1 1C S 50, Philips Semiconductors, Product Specification Re. 5.1, May 2001.
Gabber, et al., "Agora: A Minimal Distributed Protocol for Electronic Commerce", USENIX Oakland, CA, Nov. 18, 1996.

Goldwasser, Joan, "Best of the Cash-back Cards", Kiplinger's Personal Finance Magazine, Apr. 1999.
Greene, Thomas C., American Express offers temporary CC numbers for the Web, The Register, www.theregister.com.uk/content/1/13132.html, Sep. 09, 2000.
Harris, "How Fingerprint Scanners Work", http://computer.howstuffworks.com/fingerprint-scanner.htm/printable, Feb. 18, 2004, 6 pages.
http://www.palowireless.com/infotooth/tutorial.asp, Apr. 28, 2003.
http://www.palowireless.com/infotooth/tutorial/12cap.asp, Apr. 28, 2003.
http://www.palowireless.com/infotooth/tutorial/baseband.asp, Apr. 28, 2003.
http://www.palowireless.com/infotooth/tutorial/hci.asp, Apr. 28, 2003.
http://www.palowireless.com/infotooth/tutorial/Imp.asp, Apr. 28, 2003.
http://www.palowireless.com/infotooth/tutorial/k1_gap.asp, Apr. 28, 2003.
http://www.palowireless.com/infotooth/tutorial/profiles.asp, Apr. 28, 2003.
http://www.palowireless.com/infotooth/tutorial/radio.asp, Apr. 28, 2003.
http://www.palowireless.com/infotooth/tutorial/rfcomm.asp, Apr. 28, 2003.
http://www.palowireless.com/infotooth/tutorial/sdp.asp, Apr. 28, 2003.
http://www.palowireless.com/infotooth/whatis.asp, Apr. 28, 2003.
http://www.semiconductors.philips.com/news/content/file_878.html, Apr. 7, 2003.
Hurley et al., "Automatic Ear Recognition by Force Field Transformations", The Institution of Electrical Engineers, 2000, pp. 7/1-7/5.
International Newsletter of the TI RFID Group, 2000, Issue 20, 12 pages.
International Search Report and Written Opinion of the International Searching Authority, PCT/US05/26101, May 13, 2008.
Kaplan, Jeremy A., "Networking: Microsoft SPOT", http://www.pcmag.com/print_article/0,3048,a=43561,00.asp, Jul. 1, 2003, 2 pages.
Krakow, "Credit on Your Key Ring, Buy Gas at Mobil, Exxon and Soon Burgers at McDonald's", MSNBC, http://www.msnbc.msn.com/id/3072638, Feb. 17, 2004, 4 pages.
Kulkarni, et al., "Biometrics: Speaker Verification"http://biometrics.cse.msu.edu/speaker.html, Mar. 8, 2004, 5 pages.
Kuntz, Mary, "Credit Cards as Good as Gold", Forbes, Nov. 4, 1985.
Lahey, Liam, "Microsoft Bolsters Rebate Structure", Computer Dealer News, Feb. 8, 2002.
Lamond, "Credit Card Transactions Real World and Online" © 1996.
Luettin, "Visual Speech and Speaker Recognition", http://herens.idiap.ch/~luettin/luettin-thesis.bib.abs.html, Jun. 30, 2000, 1 page.
Martin, Zack, One-Time Numbers Stop Web Hackers From Pilfering Data, Card Marketing, Thomson Financial, www.cardforum.com/html/cardmark/jan01_c3.htm, Jan. 2001.
McPerson, "The Evolution of Mobile Payment", Financial Insights, http://www.banktech.com/story/news/showArticle.jhtml?articleID=17601432, Feb. 02, 2004, 2 pages.
Niccolai, James, "CES: Microsoft's SPOT Technology has Humble Origins", http://archive.inforworld.com/articles/hn/xml/03/01/10/030110hnspot.xml?s=IDGNS, Jan. 10, 2003, 3 pages.
Nyman, Judy, "Free Income Tax Clinics are Opening as Apr. 30 Deadline Draws Nearer", The Toronto Star, Final Edition, Mar. 25, 1986.
Obel, Michael, "Oil Companies Push Marketing, Cost Cutting to Fortify Earnings", Oil & Gas Journal, Sep. 16, 1985.
Prophecy Central Update #9, http://www.bible.-prophecy.com/pcu9.htm, Oct. 10, 1997, 5 pages.
RFID Smart Card Gain Ground: The convenience of contactless transactions is driving widespread adoption of contactless smart "cards", RFID Journal, Apr. 9, 2003.
Roberti, "TI Embraces Prox Card Standard", http://www.ti.com/tiris/docs/news/in_the_news/2003/3-6-03.shtml, Mar. 6, 2003, 2 pages.

Rohde, "Microsoft, IBM and Phillips Test RFID Technology", IDG New Service, http://www.computerweekly.com/Article127889.htm, Feb. 9, 2004, 3 pages.

Ross et al., "Biometrics: Hand Geometry", http://biometrics.cse.msu.msu.edu/hand_geometry.html, Feb. 26, 2004, 2 pages.

Schmuckler, Eric, "Playing Your Cards Right", Forbes, Dec. 28, 1987.

Sharp, Ken, Senior Technical Editor, "Physical Reality: A Second Look", http://www.idsystems.com/reader/1999-03/phys0399_pt2/phys0399_pt2.htm 1013442.html?tag=fd_top, Jun. 5, 2003, 1 page.

Sony, Philips to Test RFID Platform, RFID Journal, May 8, 2003, 2 pages.

Wilson, "Putting Their Finger on It", http://sanfrancisco.bizjournals.com/sanfrancisco/stories/2003/10/20/story6.html?t=printable, Feb. 9, 2004, 2 pages.

"Core One Credit Union—Discover the Advantage", http://coreone.org/2visa.html, Copyright 2001, (Last Visited Oct. 9, 2002).

* cited by examiner

* Track 1 Layout: * | SS | FC | PAN | Name | FS | Additional Data | ES | LRC |

FIG. 7

* Track 2 Layout: * | SS | PAN | FS | Additional Data | ES | LRC |

FIG. 8

*Proxy Account Identifier Track 1 Layout*

| SS | FC | PAN | NAME | FS | ADDITIONAL DATA | FS | ES | LRC |
|---|---|---|---|---|---|---|---|---|
| PF1 | PF2 PF3 PF4 | PF5 PF6 PF7 PF8 PF9 | PF10 | | PF11 | PF12 | PF13 PF14 | PF15 PF16 |

FIG. 9

*Proxy Account Identifier Track 2 Layout*

| SS | PAN | FS | ADDITIONAL DATA | ES | LRC |
|---|---|---|---|---|---|
| PF1 PF2 PF3 PF4 PF5 PF6 | PF7 | PF8 PF9 | PF10 PF11 | PF12 |

FIG. 10

*MasterCard Track Layout in Track 2*

| SS | PAN | FS | ADDITIONAL DATA | ES | LRC |

*MasterCard Proxy Account Identifier Track Layout in Track 2*

| SS | PAN | FS | ADDITIONAL DATA | ES | LRC |

SYSTEM AND METHOD FOR ENCODING INFORMATION IN MAGNETIC STRIPE FORMAT FOR USE IN RADIO FREQUENCY IDENTIFICATION TRANSACTIONS

RELATED APPLICATIONS

This invention is a continuation-in-part of, and claims priority to U.S. patent application Ser. No. 10/192,488, entitled "SYSTEM AND METHOD FOR PAYMENT USING RADIO FREQUENCY IDENTIFICATION IN CONTACT AND CONTACTLESS TRANSACTIONS," filed on Jul. 9, 2002 now U.S. Pat. No. 7,239,226 (which itself claims priority to U.S. Provisional Patent Application No. 60/304,216, filed Jul. 10, 2001), and is also a continuation-in-part of and claims priority to U.S. patent application Ser. No. 10/340,352, entitled "SYSTEM AND METHOD FOR INCENTING PAYMENT USING RADIO FREQUENCY IDENTIFICATION IN CONTACT AND CONTACTLESS TRANSACTIONS," filed Jan. 10, 2003 (which itself claims priority to U.S. Provisional Patent Application No. 60/396,577, filed Jul. 16, 2002), all of which are incorporated herein by reference.

FIELD OF INVENTION

This invention generally relates to a system and method for completing a transaction, and more particularly, to completing a transaction using a proxy transaction account identifier which emulates a transaction account number in a merchant recognizable format.

BACKGROUND OF THE INVENTION

Like barcode and voice data entry, RFID is a contactless information acquisition technology. RFID systems are wireless, and are usually extremely effective in hostile environments where conventional acquisition methods fail. RFID has established itself in a wide range of markets, such as, for example, the high-speed reading of railway containers, tracking moving objects such as livestock or automobiles, and retail inventory applications. As such, RFID technology has become a primary focus in automated data collection, identification and analysis systems worldwide.

Of late, companies are increasingly embodying RFID data acquisition technology in a fob or tag for use in completing financial transactions. A typical fob includes a transponder and is ordinarily a self-contained device which may be contained on any portable form factor. In some instances, a battery may be included with the fob to power the transponder. In which case the internal circuitry of the fob (including the transponder) may draw its operating power from the battery power source. Alternatively, the fob may exist independent of an internal power source. In this instance the internal circuitry of the fob (including the transponder) may gain its operating power directly from an RF interrogation signal. U.S. Pat. No. 5,053,774 issued to Schuermann describes a typical transponder RF interrogation system which may be found in the prior art. The Schuermann patent describes in general the powering technology surrounding conventional transponder structures. U.S. Pat. No. 4,739,328 discusses a method by which a conventional transponder may respond to a RF interrogation signal. Other typical modulation techniques which may be used include, for example, ISO/IEC 14443 and the like.

In the conventional fob systems, the fob is provided a fob identifier. The fob may be activated or powered upon presenting the fob in an interrogation signal provided by a fob reader. Once the transaction device is interrogated, the transponder included in the fob may provide the fob identifier to an authorizing entity who may correlate the fob identifier to a customer account number which is recognizable by a merchant system. That is, the information stored on the traditional fob ordinarily must be translated by an authorizing entity in order for the merchant system to be able to process the transaction request.

The customer account number may be stored on an authorizing entity database. An authorizing entity server may receive the fob identifier and correlate the fob identifier to a customer account number, which is ordinarily maintained in the authorizing entity's system database. Since the customer account number is typically a conventional credit, debit or loyalty account number, the fob may be presented to complete a transaction whereby the authorizing agent translates the fob identifier to a customer account number and provides the customer account number to the merchant system for processing under business as usual standards. The merchant system ordinarily provides the customer account number to a customer account provider which uses the number to locate the corresponding transaction account to be used to satisfy the customer's transaction request.

One of the more visible uses of the RFID technology is found in the introduction of Exxon/Mobil's Speedpass® and Shell's EasyPay® products. These products use transponders placed in a fob or tag which enables automatic identification of the user when the fob is presented at a Point of Sale (POS) device. Fob identification data is typically passed to a third-party server database, where the identification data is referenced or translated into a customer (e.g., user) credit or debit account. In an exemplary processing method, the third-party server seeks authorization for the transaction by passing a transaction request and account data to an authorizing entity. Once authorization is received by the server, clearance is sent to the point of sale device for completion of the transaction. In this way, the conventional transaction processing method involves an indirect path which causes undue overhead due to the use of the third-party server to correlate the fob identification data to a customer account prior to providing the accompanying transaction request to the merchant POS for completion.

A need exists for a transaction authorization system which allows fob transactions to be authorized while eliminating the cost associated with using third-party servers.

SUMMARY OF THE INVENTION

Described herein is a system and method for securing a transaction using a proxy transaction account identifier stored in the database of a transaction device. The proxy transaction account identifier may be segmented into multiple portions used to provide to a transaction account provider data corresponding to the a customer transaction account. The customer transaction account may include various data relevant to the account or the accountholder. For example, the customer transaction account data may include such data as the account expiration date, account identifier, account provider routing number, authentication tag, secondary security code (e.g., Personal Identification Number), effective date, and the like as is commonly found. At least one of the multiple portions of the proxy transaction account identifier may have portions of a merchant recognizable customer transaction account data stored therein.

The portions of the transaction account data included in the proxy transaction account identifier may be encrypted. The account data may be encrypted using a cryptogram generated by the transaction device to which the proxy transaction account identifier is associated. The transaction device may calculate a complete cryptogram using changing values from the transaction device and data received from a point of sale device (POS) linked to a merchant system. Once the transaction device calculates the cryptogram and encrypts the various portions of account data, the encrypted account data and a portion of the cryptogram may then be sent to the transaction account provider as a part of at least one of the multiple portions of the proxy account identifier. In this way, the space requirements for sending the proxy transaction device information is reduced.

The transaction account provider receives the proxy account identifier and recalculates the cryptogram using the encrypted account identifier data. The account provider may then verify the portion of the cryptogram included in the proxy account identifier, by for example comparing the portion of the cryptogram with the recalculated cryptogram to determine if a match exists. The account provider may decrypt the portions of the proxy account identifier and locate the corresponding account using the portions of the transaction account data. For example, the portions of the transaction account data may be subjected to an account provider defined algorithm used to generate the complete transaction account data from the portions of the account data provided in the proxy account identifier.

The proxy account identifier may take the form of any suitable data transmission which is recognizable by the merchant system. That is, the merchant system does not detect that the proxy account identifier includes only partial account information. This is true because the invention includes the partial account information in any traditional account information format. For example, if the merchant system is configured to receive information in magnetic stripe format, the proxy account identifier is provided to the merchant system in magnetic stripe format. As such, the present invention is more advantageous than conventional fob devices in that the proxy transaction account identifier does not have to be sent to a third-party authorizing entity for correlation to a customer number formatted in magnetic stripe which may then be sent to a merchant system for processing. The present invention eliminates the cost associated with involving a third-party server to translate the account fob data into a merchant recognizable format (e.g., magnetic stripe).

In addition, the transaction device according to the present invention may include a transponder system for using RFID technology to initiate and complete financial transactions. The transaction system described herein may include a RFID reader operable to provide a RF interrogation signal for powering a transponder system, receiving a transponder system RF signal, and providing proxy account identifier account data relative to the transponder system RF signal. The transponder-reader payment system may include a RFID protocol/sequence controller in electrical communication with one or more interrogators for providing an interrogation signal to a transponder, and a RFID authentication circuit for authenticating the signal received from the transponder. The transponder-reader payment system may further include a fob including one or more transponders (e.g., modules) responsive to the interrogation signal and for providing an authentication signal for verifying that the transponder and/or the RFID reader are authorized to operate within the transponder-reader payment system. In this way, the transponder may be responsive to multiple interrogation signals provided at different frequencies. Further, the transponder may include a USB or serial interface for use with a computer network or with the RFID reader.

The RFID system and method according to the present invention may include a RFID-ready terminal and a transponder which may be embodied in a transaction device taking any suitable form capable of being presented for interrogation, such as, a fob, tag, card or any other form factor (e.g., wristwatch, keychain, cell phone, etc.), or the like. In that regard, although the transaction device is described herein as embodied in a fob, the invention is not so limited.

The system may further include a RFID reader configured to send a standing RFID recognition signal which may be transmitted from the RFID reader via radio frequency (or electromagnetic) propagation. The fob may be placed within proximity to the RFID reader such that the RFID signal may interrogate the fob and initialize fob identification procedures.

These features and other advantages of the system and method, as well as the structure and operation of various exemplary embodiments of the system and method, are described below.

BRIEF DESCRIPTION OF THE DRAWINGS

The accompanying drawings, wherein like numerals depict like elements, illustrate exemplary embodiments of the present invention, and together with the description, serve to explain the principles of the invention. In the drawings:

FIG. 7 illustrates an exemplary layout of data fields for encoding data in traditional magnetic stripe track 1;

FIG. 8 illustrates an exemplary layout of data fields for encoding data in traditional magnetic stripe track 2;

FIG. 9 illustrates an exemplary layout of proxy fields for encoding data in proxy track 1 format;

FIG. 10 illustrates an exemplary layout of proxy fields for encoding data in proxy track 2 format;

FIG. 12 is an example of a conventional magnetic stripe track 2 layout for MasterCard; and FIG. 13 is an example of a proxy track 2 layout for MasterCard in accordance with the present invention.

DETAILED DESCRIPTION

The present invention may be described herein in terms of functional block components, screen shots, optional selections and various processing steps. Such functional blocks may be realized by any number of hardware and/or software components configured to perform to specified functions. For example, the present invention may employ various integrated circuit components (e.g., memory elements, processing elements, logic elements, look-up tables, and the like), which may carry out a variety of functions under the control of one or more microprocessors or other control devices. Similarly, the software elements of the present invention may be implemented with any programming or scripting language or platforms such as C, C++, Java, JavaCard applets, MULTOS Executive Language, COBOL, assembler, PERL, extensible markup language (XML), JavaCard and MULTOS with the various algorithms being implemented with any combination of data structures, objects, processes, routines or other programming elements. Further, it should be noted that the present invention may employ any number of conventional techniques for data transmission, signaling, data processing, network control, and the like. For a basic introduction on cryptography, review a text written by Bruce Schneier entitled "Applied Cryptography: Protocols, Algorithms, and Source Code in C," published by John Wiley & Sons (second edition, 1996), herein incorporated by reference.

In addition, many applications of the present invention could be formulated. The exemplary network disclosed herein may include any system for exchanging data or transacting business, such as the internet, an intranet, an extranet, WAN, LAN, satellite communications, and/or the like. It is noted that the network may be implemented as other types of networks, such as an interactive television network (ITN).

Where required, the system user may interact with the system via any input device such as, a keypad, keyboard, mouse, kiosk, personal digital assistant, handheld computer (e.g., Palm Pilot®, Blueberry®), cellular phone and/or the like. Similarly, the invention could be used in conjunction with any type of personal computer, network computer, work station, minicomputer, mainframe, or the like running any operating system such as any version of Windows, Windows NT, Windows 2000, Windows 98, Windows 95, MacOS, OS/2, BeOS, Linux, UNIX, Solaris or the like. Moreover, although the invention may frequently be described as being implemented with TCP/IP communications protocol, it should be understood that the invention could also be implemented using SNA, IPX, Appletalk, IPte, NetBIOS, OSI or any number of communications protocols. Moreover, the system contemplates, the use, sale, or distribution of any goods, services or information over any network having similar functionality described herein.

Figure 1:
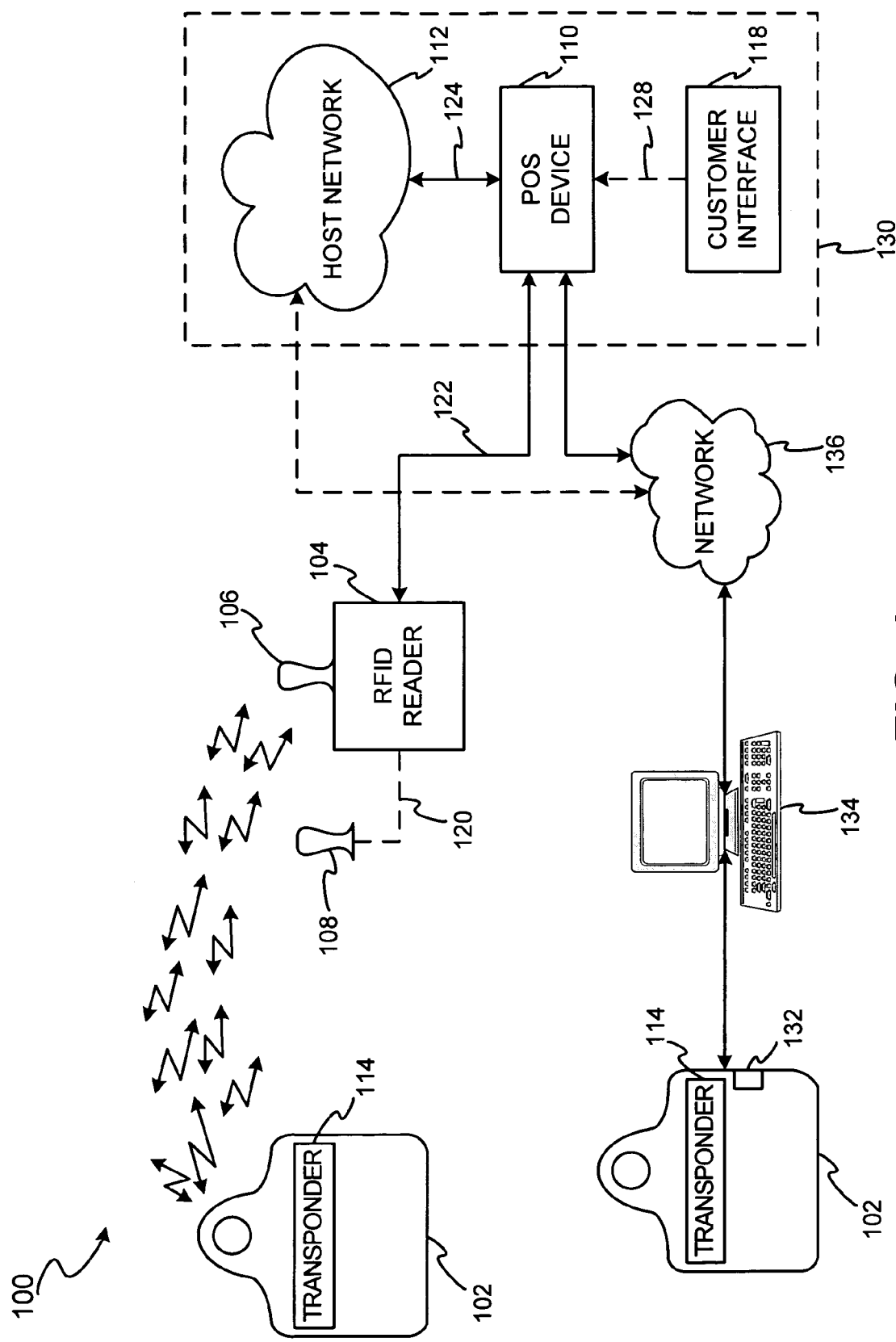
FIG. 1 illustrates an exemplary RFID-based system in accordance with the present invention, wherein exemplary components used for fob transaction completion are depicted.

FIG. 1 illustrates an exemplary RFID transaction system 100 in accordance with the present invention, wherein exemplary components for use in completing a fob transaction are depicted. In general, the operation of system 100 may begin when fob transponder system 102 (e.g., fob 102) is presented for payment, and is interrogated by RFID reader 104 or, alternatively, interface 134. Fob 102 and RFID reader 104 may then engage in mutual authentication after which the transponder 102 may provide the transponder identification and/or account identifier to the RFID reader 104 which may further provide the information to the merchant system 130 POS device 110.

System 100 may include a fob 102 having a transponder 114 and a RFID reader 104 in RF communication with fob 102. Although the present invention is described with respect to a fob 102, the invention is not to be so limited. Indeed, system 100 may include any transaction device configured to communicate data for transaction completion. In one exemplary embodiment the transaction device may be configured to communicate with a RFID reader 104 via RF communication. Typical devices may include, for example, a key ring, tag, card, cell phone, wristwatch or any such form capable of being presented for interrogation.

The RFID reader 104 may be configured to communicate using a RFID internal antenna 106. Alternatively, RFID reader 104 may include an external antenna 108 for communications with fob 102, where the external antenna may be made remote to the RFID reader 104 using a suitable cable and/or data link 120. RFID reader 104 may be further in communication with a merchant system 130 via a data link 122. The system 100 may include a transaction completion system including a point of interaction device such as, for example, a merchant point of sale (POS) device 110 or a computer interface (e.g., user interface) 134. In one exemplary embodiment the transaction completion system may include a merchant system 130 including the POS device 110 in communication with a RFID reader 104 (via data link 122). As described more fully below, the transaction completion system may include the user interface 134 connected to a network 136 and to the transponder via a USB connector 132.

Although the point of interaction device is described herein with respect to a merchant point of sale (POS) device, the invention is not to be so limited. Indeed, a merchant POS device is used herein by way of example, and the point of interaction device may be any device capable of receiving data relative to fob 102. In this regard, the POS device 110 may be any point of interaction device enabling the user to complete a transaction using a fob 102. POS device 110 may be in further communication with a customer interface 118 (via data link 128) for entering at least a customer identity verification information. In addition, POS device 110 may be in communication with a merchant host network 112 (via data link 124) for processing any transaction request. In this arrangement, information provided by RFID reader 104 is provided to the POS device 110 of merchant system 130 via data link 122. The POS device 110 may receive the information (and alternatively may receive any identity verifying information from customer interface 118 via data link 128) and provide the information to host system 112 for processing.

A variety of conventional communications media and protocols may be used for data links 120, 122, 124, and 128. For example, data links 120, 122, 124, and 128 may be an Internet Service Provider (ISP) configured to facilitate communications over a local loop as is typically used in connection with standard modem communication, cable modem, dish networks, ISDN, Digital Subscriber Lines (DSL), or any wireless communication media. In addition, the merchant system 130 including the POS device 110 and host network 112 may reside on a local area network which interfaces to a remote network (not shown) for remote authorization of an intended transaction. The merchant system 130 may communicate with the remote network via a leased line, such as a T1, D3 line, or the like. Such communications lines are described in a variety of texts, such as, "Understanding Data Communications," by Gilbert Held, which is incorporated herein by reference.

An account number, as used herein, may include any identifier for an account (e.g., credit, charge debit, checking, savings, reward, loyalty, or the like) which may be maintained by a transaction account provider (e.g., payment authorization center) and which may be used to complete a financial transaction. A typical account number (e.g., account data) may be correlated to a credit or debit account, loyalty account, or rewards account maintained and serviced by such entities as American Express, Visa and/or MasterCard or the like. For ease in understanding, the present invention may be described with respect to a credit account. However, it should be noted that the invention is not so limited and other accounts permitting an exchange of goods and services for an account data value is contemplated to be within the scope of the present invention.

In addition, the account number (e.g., account data) may be associated with any device, code, or other identifier/indicia suitably configured to allow the consumer to interact or communicate with the system, such as, for example, authorization/access code, personal identification number (PIN), Internet code, digital certificate, biometric data, and/or other identification indicia. The account number may be optionally located on a rewards card, charge card, credit card, debit card, prepaid card, telephone card, smart card, magnetic stripe card, bar code card, and/or the like. The account number may be distributed and stored in any form of plastic, electronic, magnetic, and/or optical device capable of transmitting or downloading data to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". Additionally, the first five to seven digits may be reserved for processing purposes and identify the issuing bank, card type and etc. In a typical example, the first digit of the account number may be a common character which may correspond to a particular account provider. For example, account numbers beginning with the common character 4 may correspond to transaction accounts provided by VISA; account numbers beginning with the number 5 may correspond to transaction accounts provided by MASTERCARD; account numbers beginning with the common character 3 may correspond to transaction accounts provided by AMERICAN EXPRESS. In this example, the last sixteenth digit, sometimes called the "Longitudinal Redundancy Check" character, is used as a sum check for the sixteen-digit number. The intermediary eight-to-ten digits are used to uniquely identify the customer.

The account number may be stored as Track 1 and Track 2 data as defined in ISO/IEC 7813, and further may be made unique to fob 102. In one exemplary embodiment, the account number may include a unique fob serial number and user identification number, as well as specific application applets. The account number may be stored in fob 102 inside a database 214, as described more fully below. Database 214 may be configured to store multiple account numbers issued to the fob 102 user by the same or different account providing institutions. Where the account data corresponds to a loyalty or rewards account, the database 214 may be configured to store the attendant loyalty or rewards points data.

Figure 2:
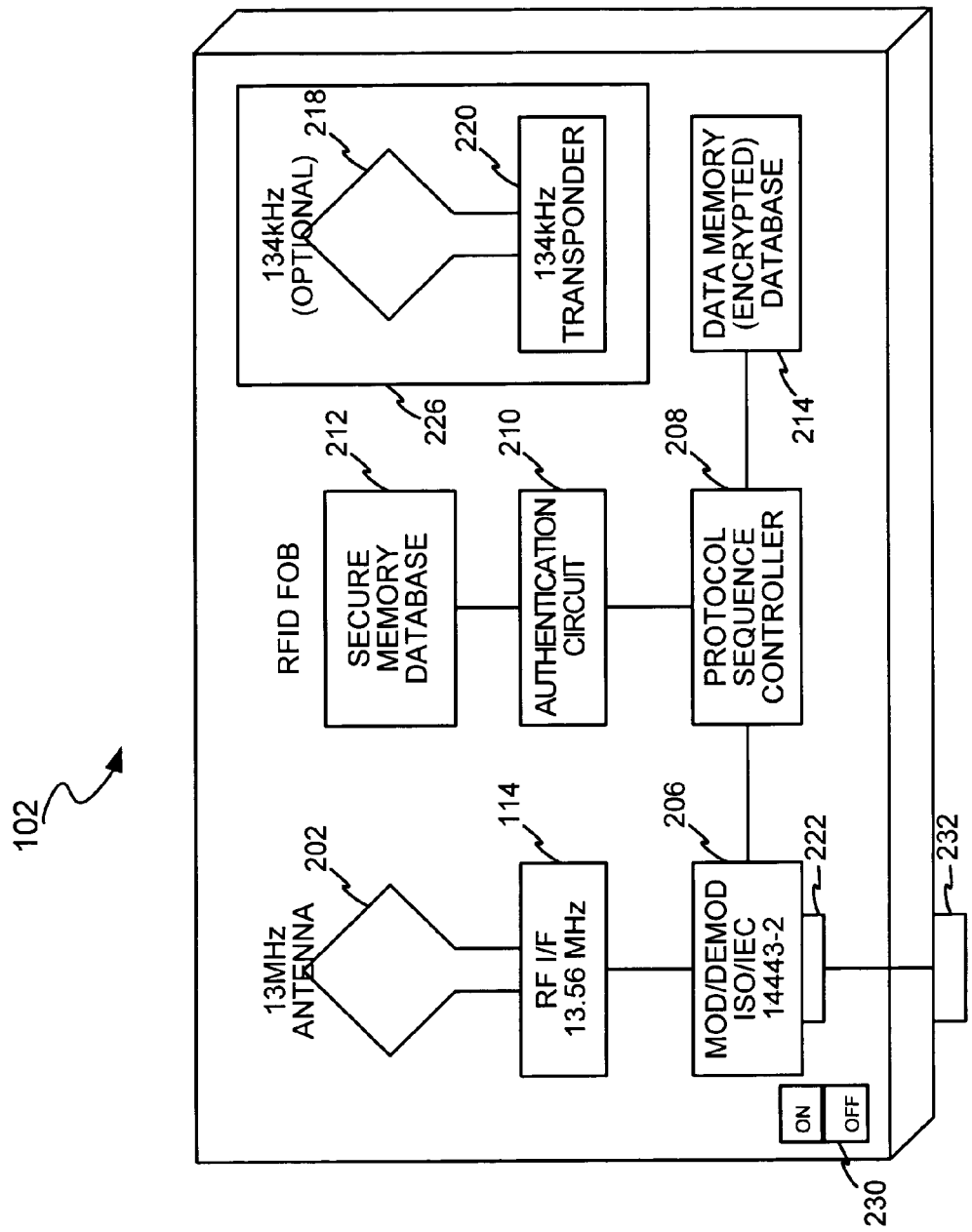
FIG. 2 is a schematic illustration of an exemplary transponder system in accordance with the present invention.

FIG. 2 illustrates a block diagram of the many functional blocks of an exemplary fob 102 in accordance with the present invention. Fob 102 may be a RFID fob 102 which may be presented by the user to facilitate an exchange of funds or points, etc., for receipt of goods or services. As described herein, by way of example, the fob 102 may be a RFID fob which may be presented for facilitating payment for goods and/or services.

Fob 102 may include an antenna 202 for receiving an interrogation signal from RFID reader 104 via antenna 106 (or alternatively, via external antenna 108). Fob antenna 202 may be in communication with a transponder 114. In one exemplary embodiment, transponder 114 may be a 13.56 MHz transponder compliant with the ISO/IEC 14443 standard, and antenna 202 may be of the 13 MHz variety. The transponder 114 may be in communication with a transponder compatible modulator/demodulator 206 configured to receive the signal from transponder 114 and configured to modulate the signal into a format readable by any later connected circuitry. Further, modulator/demodulator 206 may be configured to format (e.g., demodulate) a signal received from the later connected circuitry in a format compatible with transponder 114 for transmitting to RFID reader 104 via antenna 202. For example, where transponder 114 is of the 13.56 MHz variety, modulator/demodulator 206 may be ISO/IEC 14443-2 compliant.

Modulator/demodulator 206 may be coupled to a protocol/sequence controller 208 for facilitating control of the authentication of the signal provided by RFID reader 104, and for facilitating control of the sending of the fob 102 account number. In this regard, protocol/sequence controller 208 may be any suitable digital or logic driven circuitry capable of facilitating determination of the sequence of operation for the fob 102 inner-circuitry. For example, protocol/sequence controller 208 may be configured to determine whether the signal provided by the RFID reader 104 is authenticated, and thereby providing to the RFID reader 104 the account number stored on fob 102.

Protocol/sequence controller 208 may be further in communication with authentication circuitry 210 for facilitating authentication of the signal provided by RFID reader 104. Authentication circuitry may be further in communication with a non-volatile secure memory database 212. Secure memory database 212 may be any suitable elementary file system such as that defined by ISO/IEC 7816-4 or any other elementary file system allowing a lookup of data to be interpreted by the application on the chip. Database 212 may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. Database 212 may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The data may be used by protocol/sequence controller 208 for data analysis and used for management and control purposes, as well as security purposes. Authentication circuitry may authenticate the signal provided by RFID reader 104 by association of the RFID signal to authentication keys stored on database 212. Encryption circuitry may use keys stored on database 212 to perform encryption and/or decryption of signals sent to or from the RFID reader 104.

In addition, protocol/sequence controller 208 may be in communication with a database 214 for storing at least a fob 102 account data, and a unique fob 102 identification code. Protocol/sequence controller 208 may be configured to retrieve the account number from database 214 as desired.

Database 214 may be of the same configuration as database 212 described above. The fob account data and/or unique fob identification code stored on database 214 may be encrypted prior to storage. Thus, where protocol/sequence controller 208 retrieves the account data, and or unique fob identification code from database 214, the account number may be encrypted when being provided to RFID reader 104. Further, the data stored on database 214 may include, for example, an unencrypted unique fob 102 identification code, a user identification, Track 1 and 2 data, as well as specific application applets.

Fob 102 may be configured to respond to multiple interrogation frequency transmissions provided by RFID reader 104. That is, as described more fully below, RFID reader 104 may provide more than one RF interrogation signal. In this case, fob 102 may be configured to respond to the multiple frequencies by including in fob 102 one or more additional RF signal receiving/transmitting units 226. RF signal receiving/transmitting unit 226 may include an antenna 218 and transponder 220 where the antenna 218 and transponder 220 are compatible with at least one of the additional RF signals provided by RFID reader 104. For example, in one exemplary embodiment, fob 102 may include a 134 KHz antenna 218 configured to communicate with a 134 KHz transponder 220. In this exemplary configuration, an ISO/IEC 14443-2 compliant modulator/demodulator may not be required. Instead, the 134 KHz transponder may be configured to communicate directly with the protocol/sequence controller 208 for transmission and receipt of authentication and account number signals as described above.

In another embodiment, fob 102 may further include a universal serial bus (USB) connector 132 for interfacing fob 102 to a user interface 134. User interface 134 may be further in communication with a POS device 110 via a network 136. Network 136 may be the Internet, an intranet, or the like as is described above with respect to network 112. Further, the user interface 134 may be similar in construction to any conventional input devices and/or computing systems aforementioned for permitting the system user to interact with the system. In one exemplary embodiment, fob 102 may be configured to facilitate online Internet payments. A USB converter 222 may be in communication with a USB connector 232 for facilitating the transfer of information between the modulator/demodulator 206 and USB connector 132. Alternatively, USB converter 222 may be in communication with protocol/sequence controller 208 to facilitate the transfer of information between protocol/sequence controller 208 and USB connector 132.

Where fob 102 includes a USB connector 132, fob 102 may be in communication with, for example, a USB port on user interface 134. The information retrieved from fob 102 may be compatible with credit card and/or smart card technology enabling usage of interactive applications on the Internet. No RFID reader may be required in this embodiment since the connection to POS device 110 may be made using a USB port on user interface 134 and a network 136.

Fob 102 may include means for enabling activation of the fob by the user. In one exemplary embodiment, a switch 230 which may be operated by the user of the fob 102. The switch 230 on fob 102 may be used to selectively or inclusively activate the fob 102 for particular uses. In this context, the term "selectively" may mean that the switch 230 enables the user to place the fob 102 in a particular operational mode. For example, the user may place the fob 102 in a mode for enabling purchase of a good or of a service using a selected account number. Alternatively, the fob may be placed in a mode as such that the fob account number is provided by USB port 132 (or serial port) only and the fob transponder 114 is disabled. In addition, the term "inclusively" may mean that the fob 102 is placed in an operational mode permitting the fob 102 to be responsive to the RF interrogation and interrogation via the USB connector 132. In one particular embodiment, the switch 230 may remain in an OFF position ensuring that one or more applications or accounts associated with the fob 102 are non-reactive to any commands issued by RFID reader 104. As used herein, the OFF position may be termed the "normal" position of the activation switch 230, although other normal positions are contemplated.

In another exemplary embodiment, when the switch 230 is moved from the OFF position, the fob 102 may be deemed activated by the user. That is, the switch 230 may activate internal circuitry in fob 102 for permitting the fob to be responsive to RF signals (e.g., commands from RFID reader 104). In this way, switch 230 may facilitate control of the active and inactive states of the fob 102. Such control increases the system security by preventing inadvertent or illegal use of the fob 102.

In one exemplary embodiment, switch 230 may be a simple mechanical device in communication with circuitry which may electrically prevent the fob from being powered by a RFID reader. That is, when switch 230 is in its normal position, switch 230 may provide a short to the fob 102 internal circuitry, preventing fob 102 from being responsive to interrogation by RF or via the USB connector 230. In this arrangement, the switch 230 may be, for example, a "normally closed" (NC) configured switch, which may be electrically connected to the antenna 202 at the interface of the antenna 202 and the transponder 114. The switch 230 may be depressed, which may open the switch 230 fully activating the antenna 202.

In yet another exemplary embodiment, the fob 102 may include a biometric sensor and biometric membrane configured to operate as switch 230 and activate the fob 102 when provided biometric signal from the fob 102 user. Such biometric signal may be the digital reading of a fingerprint, thumbprint, or the like. Typically, where biometric circuitry is used, the biometric circuitry may be powered by an internal voltage source (e.g., battery). In this case, the switch may not be a simple mechanical device, but a switch which is powered. In yet another exemplary embodiment, switch 230 may be battery powered though no biometric circuitry is present in the fob 102.

In yet another embodiment, the switch 230 may be a logic switch. Where switch 230 is a logic switch the switch 230 control software may be read from the sequence controller 208 to selectively control the activation of the various fob 102 components.

Figure 3:
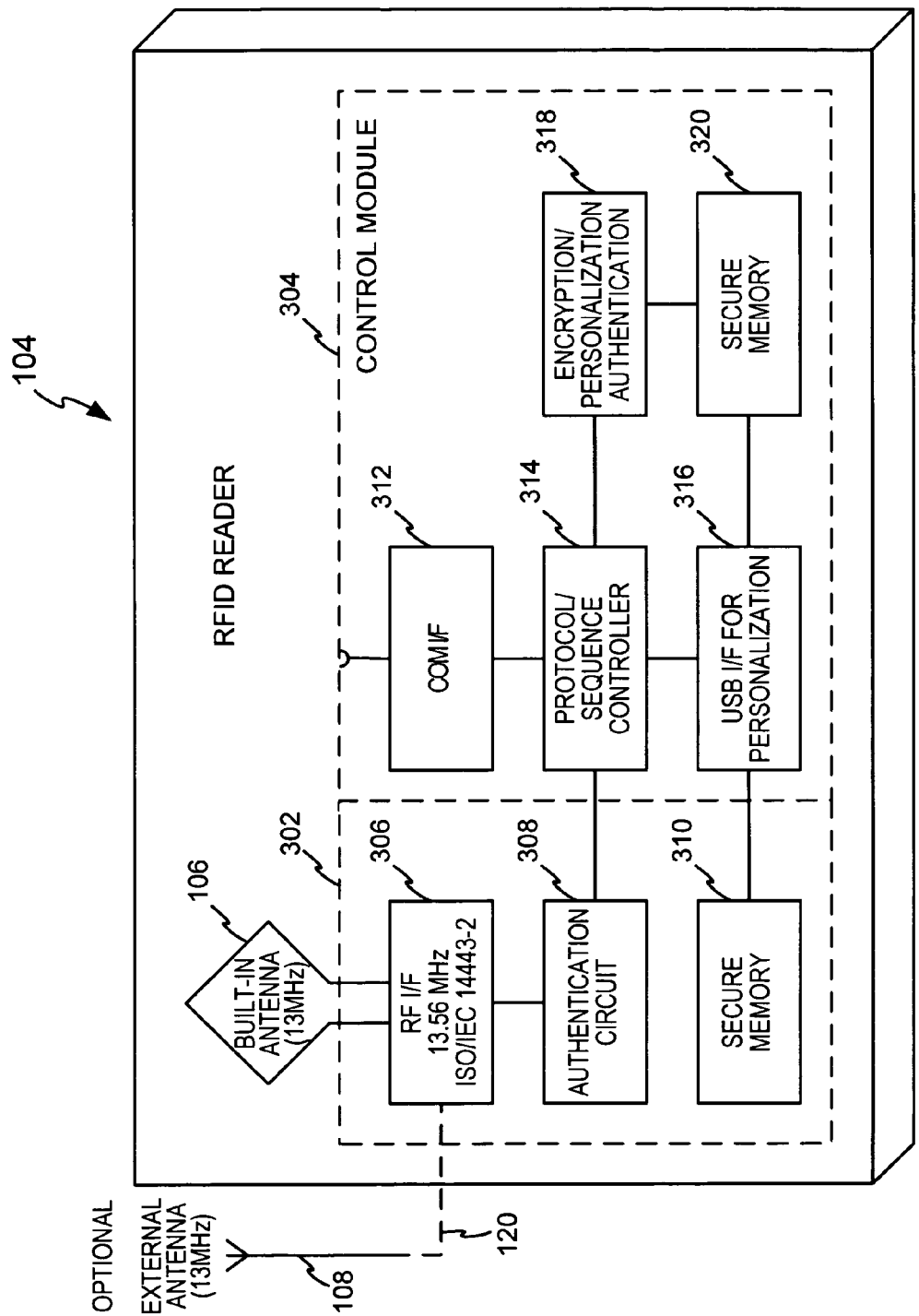
FIG. 3 is a schematic illustration of an exemplary RFID reader in accordance with the present invention.

FIG. 3 illustrates an exemplary block diagram of a RFID reader 104 in accordance with an exemplary embodiment of the present invention. RFID reader 104 includes, for example, an antenna 106 coupled to a RF module 302, which is further coupled to a control module 304. In addition, RFID reader 104 may include an antenna 108 positioned remotely from the RFID reader 104 and coupled to RFID reader 104 via a suitable cable 120, or other wire or wireless connection.

RF module 302 and antenna 106 may be suitably configured to facilitate communication with fob 102. Where fob 102 is formatted to receive a signal at a particular RF frequency, RF module 302 may be configured to provide an interrogation signal at that same frequency. For example, in one exemplary embodiment, fob 102 may be configured to respond to an interrogation signal of about 13.56 MHz. In this case, RFID antenna 106 may be 13 MHz and may be configured to transmit an interrogation signal of about 13.56 MHz. That is, fob 102 may be configured to include a first and second RF module (e.g., transponder) where the first module may operate using a 134 kHz frequency and the second RF module may operate using a 13.56 MHz frequency. The RFID reader 104 may include two receivers which may operate using the 134 kHz frequency, the 13.56 MHz frequency or both. When the reader 104 is operating at 134 kHz frequency, only operation with the 134 kHz module on the fob 102 may be possible. When the reader 104 is operating at the 13.56 MHz frequency, only operation with the 13.56 MHz module on the fob 102 may be possible. Where the reader 104 supports both a 134 kHz frequency and a 13.56 MHz RF module, the fob 102 may receive both signals from the reader 104. In this case, the fob 102 may be configured to prioritize selection of the one or the other frequency and reject the remaining frequency. Alternatively, the reader 104 may receive signals at both frequencies from the fob upon interrogation. In this case, the reader 104 may be configured to prioritize selection of one or the other frequency and reject the remaining frequency.

Further, protocol/sequence controller 314 may include an optional feedback function for notifying the user of the status of a particular transaction. For example, the optional feedback may be in the form of an LED, LED screen and/or other visual display which is configured to light up or display a static, scrolling, flashing and/or other message and/or signal to inform the fob 102 user that the transaction is initiated (e.g., fob is being interrogated), the fob is valid (e.g., fob is authenticated), transaction is being processed, (e.g., fob account number is being read by RFID reader) and/or the transaction is accepted or denied (e.g., transaction approved or disapproved). Such an optional feedback may or may not be accompanied by an audible indicator (or may present the audible indicator singly) for informing the fob 102 user of the transaction status. The audible feedback may be a simple tone, multiple tones, musical indicator, and/or voice indicator configured to signify when the fob 102 is being interrogated, the transaction status, or the like.

RFID antenna 106 may be in communication with a transponder 306 for transmitting an interrogation signal and receiving at least one of an authentication request signal and/or an account data from fob 102. Transponder 306 may be of similar description as transponder 114 of FIG. 2. In particular, transponder 306 may be configured to send and/or receive RF signals in a format compatible with antenna 202 in similar manner as was described with respect to fob transponder 114. For example, where transponder 306 is 13.56 MHz RF rated antenna 202 may be 13.56 MHz compatible. Similarly, where transponder 306 is ISO/IEC 14443 rated, antenna 106 may be ISO/IEC 14443 compatible.

RF module 302 may include, for example, transponder 306 in communication with authentication circuitry 308 which may be in communication with a secure database 310. Authentication circuitry 308 and database 310 may be of similar description and operation as described with respect to authentication circuitry 210 and secure memory database 214 of FIG. 2. For example, database 310 may store data corresponding to the fob 102 which are authorized to transact business over system 100. Database 310 may additionally store RFID reader 104 identifying information for providing to fob 102 for use in authenticating whether RFID reader 104 is authorized to be provided the fob account number stored on fob database 214.

Authentication circuitry 308 may be of similar description and operation as authentication circuitry 210. That is, authentication circuitry 308 may be configured to authenticate the signal provided by fob 102 in similar manner that authentication circuitry 210 may be configured to authenticate the signal provided by RFID reader 104. As is described more fully below, fob 102 and RFID reader 104 engage in mutual authentication. In this context, "mutual authentication" may mean that operation of the system 100 may not take place until fob 102 authenticates the signal from RFID reader 104, and RFID reader 104 authenticates the signal from fob 102.

Figure 4:
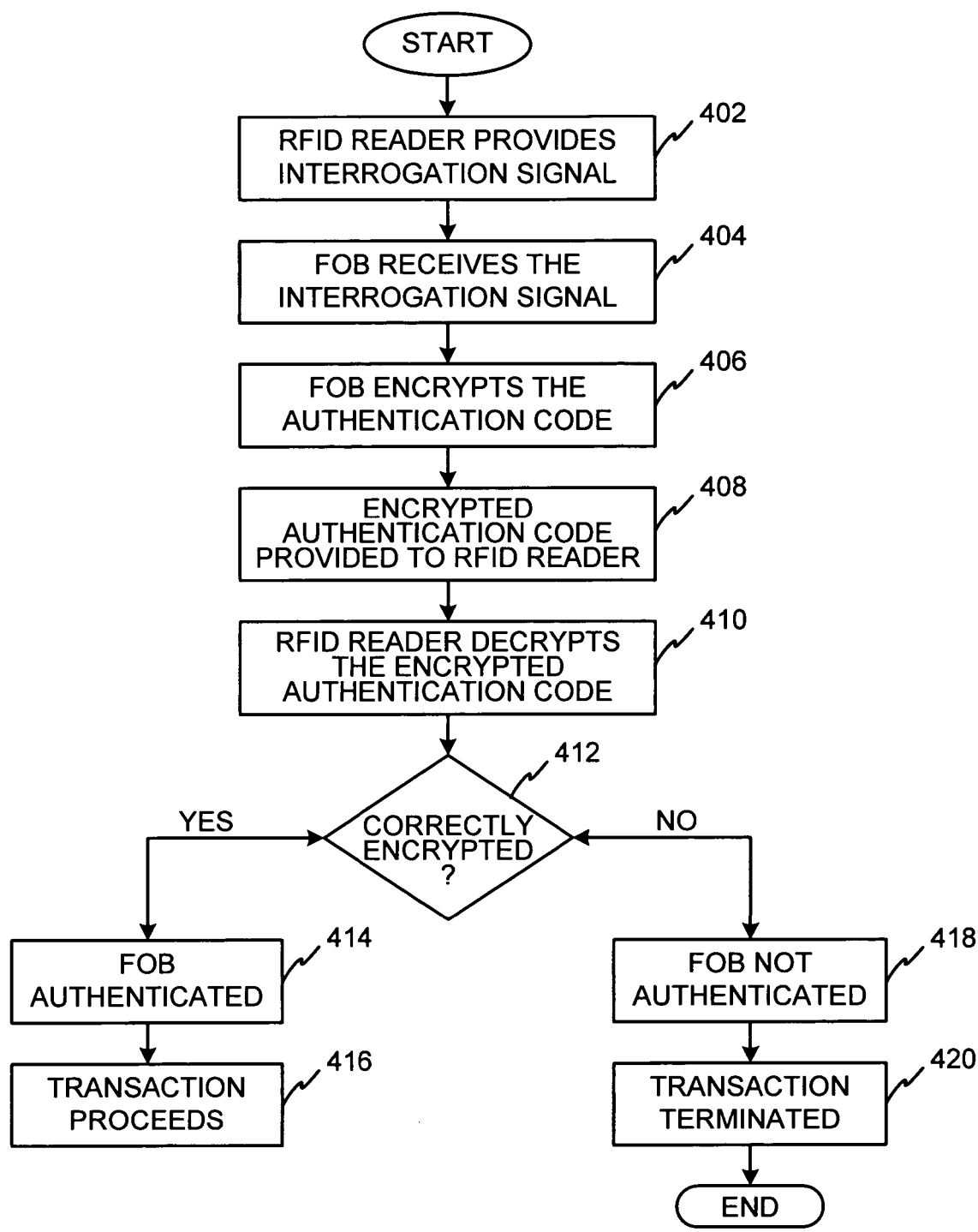
FIG. 4 is an exemplary flow diagram of an exemplary authentication process in accordance with the present invention.

FIG. 4 is a flowchart of an exemplary authentication process in accordance with the present invention. The authentication process is depicted as one-sided. That is, the flowchart depicts the process of the RFID reader 104 authenticating the fob 102, although similar steps may be followed in the instance that fob 102 authenticates RFID reader 104.

As noted, database 214 may store security keys for encrypting or decrypting signals received from RFID reader 104. In an exemplary authentication process, where RFID reader 104 is authenticating fob 102, RFID reader 104 may provide an interrogation signal to fob 102 (step 402). The interrogation signal may include a random code generated by the RFID reader authentication circuit 308, which is provided to the fob 102 and which is encrypted using an unique encryption key corresponding to the fob 102 unique identification code. For example, the protocol/sequence controller 314 may provide a command to activate the authentication circuitry 308. Authentication circuitry 308 may provide from database 310 a fob interrogation signal including a random number as a part of the authentication code generated for each authentication signal. The authentication code may be an alphanumeric code which is recognizable (e.g., readable) by the RFID reader 104 and the fob 102. The authentication code may be provided to the fob 102 via the RFID RF interface 306 and antenna 106 (or alternatively antenna 108).

Fob 102 receives the interrogation signal (step 404). The interrogation signal including the authorization code may be received at the RF interface 114 via antenna 202. Once the fob 102 is activated, the interrogation signal including the authorization code may be provided to the modulator/demodulator circuit 206 where the signal may be demodulated prior to providing the signal to protocol/sequence controller 208. Protocol/sequence controller 208 may recognize the interrogation signal as a request for authentication of the fob 102, and provide the authentication code to authentication circuit 210. The fob 102 may then encrypt the authentication code (step 406). In particular, encryption may be done by authentication circuit 210, which may receive the authentication code and encrypt the code prior to providing the encrypted authentication code to protocol/sequence controller 208. Fob 102 may then provide the encrypted authentication code to the RFID reader 104 (step 408). That is, the encrypted authentication code may be provided to the RFID reader 104 via modulator/demodulator circuit 206, RF interface 114 (e.g., transponder 114) and antenna 202.

RFID reader 104 may then receive the encrypted authentication code and decryption it (step 410). That is, the encrypted authentication code may be received at antenna 106 and RF interface 306 and may be provided to authentication circuit 308. Authentication circuit 308 may be provided a security authentication key (e.g., transponder system decryption key) from database 310. The authentication circuit may use the authentication key to decrypt (e.g., unlock) the encrypted authorization code. The authentication key may be provided to the authentication circuit based on the fob 102 unique identification code. For example, the encrypted authentication code may be provided along with the unique fob 102 identification code. The authentication circuit may receive the fob 102 unique identification code and retrieve from the database 310 a transponder system decryption key correlative to the unique fob 102 identification code for use in decrypting the encrypted authentication code.

Once the authentication code is decrypted, the decrypted authentication code is compared to the authentication code provided by the RFID reader 104 at step 402 (step 412) to verify its authenticity. If the decrypted authorization code is not readable (e.g., recognizable) by the authentication circuit 308, the fob 102 is deemed to be unauthorized or not authenticated (e.g., unverified) (step 418) and the operation of system 100 is terminated (step 420). Contrarily, if the decrypted authorization code is recognizable (e.g., verified) by the fob 102, the decrypted authorization code is deemed to be authenticated and the fob 102 is considered authenticated (e.g., verified) (step 414), and the transaction is allowed to proceed (step 416). In one particular embodiment, the proceeding transaction may mean that the fob 102 may authenticate the RFID reader 104, although, it should be apparent that the RFID reader 104 may authenticate the fob 102 prior to the fob 102 authenticating the RFID reader 104.

It should be noted that in an exemplary verification process, the authorization circuit 308 may determine whether the unlocked authorization code is identical to the authorization code provided in step 402. If the codes are not identical then the fob 102 is not authorized to access system 100. Although, the verification process is described with respect to identicality, identicality is not required. For example, authentication circuit 308 may verify the decrypted code through any protocol, steps, or process for determining whether the decrypted code corresponds to an authorized fob 102.

Figure 5:
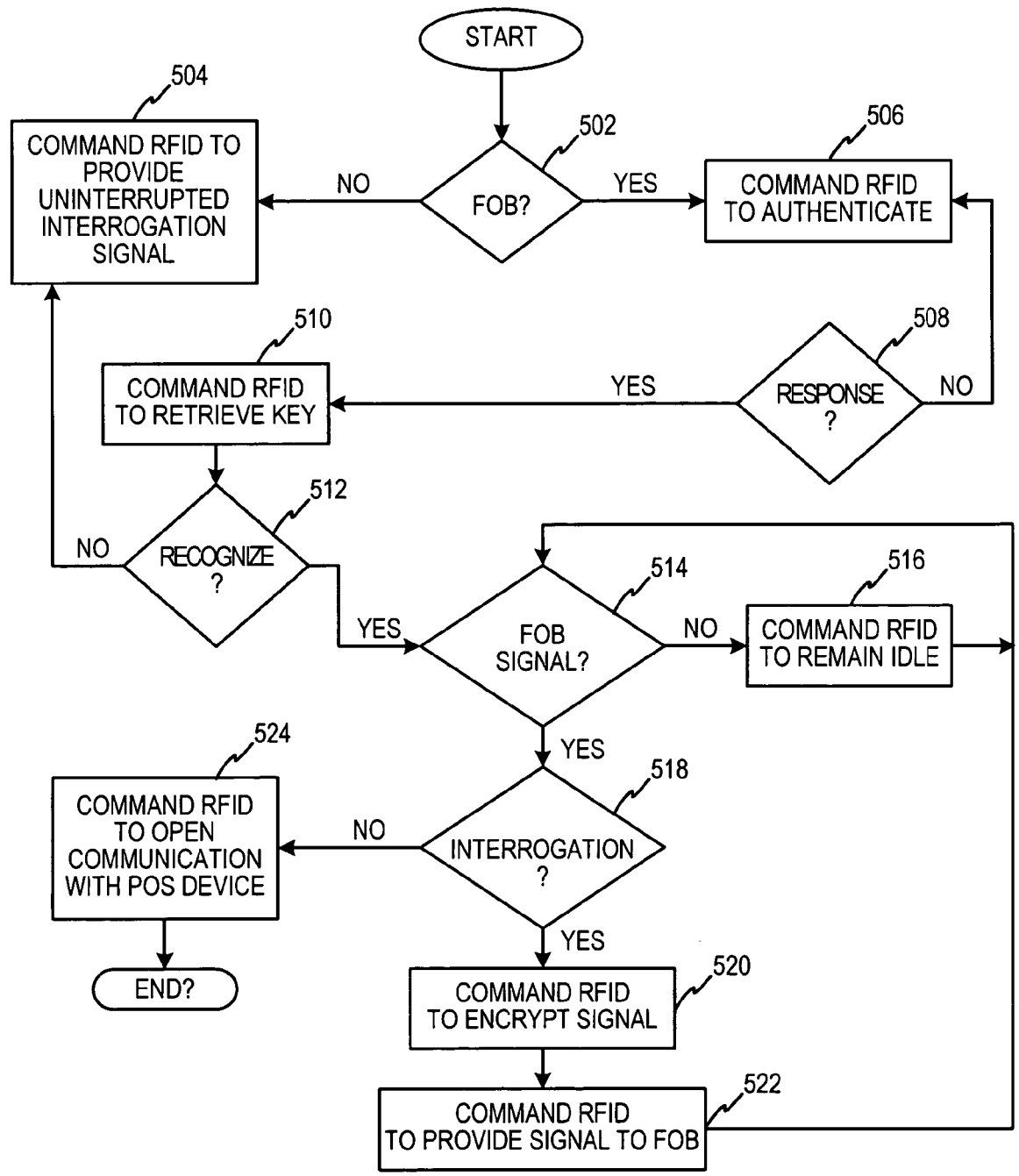
FIG. 5 is an exemplary flow diagram of an exemplary decision process for a protocol/sequence controller in accordance with the present invention.

Authentication circuitry 308 may additionally be in communication with a protocol/sequence controller 314 of similar operation and description as protocol/sequence controller 208 of FIG. 2. That is, protocol/sequence device controller 314 may be configured to determine the order of operation of the RFID reader 104 components. For example, FIG. 5 illustrates and exemplary decision process under which protocol/sequence controller 314 may operate. Protocol/sequence controller 314 may command the different components of RFID reader 104 based on whether a fob 102 is present (step 502). For example, if a fob 102 is not present, then protocol/sequence controller 314 may command the RFID reader 104 to provide an uninterrupted interrogation signal (step 504). That is, the protocol/sequence controller may command the authentication circuit 308 to provide an uninterrupted interrogation signal until the presence of a fob 102 is realized. If a fob 102 is present, the protocol/sequence controller 314 may command the RFID reader 104 to authenticate the fob 102 (step 506).

As noted above, authentication may mean that the protocol/sequence controller 314 may command the authentication circuit 308 to provide fob 102 with an authorization code. If a response is received from fob 102, protocol/sequence controller may determine if the response is a response to the RFID reader 104 provided authentication code, or if the response is a signal requiring authentication (step 508). If the signal requires authentication, then the protocol/sequence controller 314 may activate the authentication circuit as described above (step 506). On the other hand, if the fob 102 signal is a response to the provided authentication code, then the protocol/sequence controller 314 may command the RFID reader 104 to retrieve the appropriate security key for enabling recognition of the signal (step 510). That is, the protocol/sequence controller 314 may command the authentication circuit 308 to retrieve from database 310 a security key (e.g., transponder system decryption key), unlock the signal, and compare the signal to the signal provided by the RFID reader 104 in the authentication process (e.g., step 506). If the signal is recognized, the protocol/sequence controller 314 may determine that the fob 102 is authorized to access the system 100. If the signal is not recognized, then the fob is considered not authorized. In which case, the protocol/sequence controller 314 may command the RFID controller to interrogate for authorized fobs (step 504).

Once the protocol/sequence controller determines that the fob 102 is authorized (step 512), the protocol/sequence controller 314 may seek to determine if additional signals are being sent by fob 102 (step 514). If no additional signal is provided by fob 102, then the protocol/sequence controller 314 may provide all the components of RFID reader 104 to remain idle until such time as a signal is provided (step 516). Contrarily, where an additional fob 102 signal is provided, the protocol/sequence controller 314 may determine if the fob 102 is requesting access to the merchant point of sale terminal 110 (e.g., POS device) or if the fob 102 is attempting to interrogate the RFID reader 104 for return (e.g., mutual) authorization (step 518). Where the fob 102 is requesting access to a merchant point of sale terminal 110, the protocol/sequence controller 314 may command the RFID reader to open communications with the point of sale terminal 110 (step 524). In particular, the protocol/sequence controller may command the point of sale terminal communications interface 312 to become active, permitting transfer of data between the RFID reader 104 and the merchant point of sale terminal 110.

On the other hand, if the protocol/sequence controller determines that the fob 102 signal is a mutual interrogation signal, then the protocol/sequence controller may command the RFID reader 104 to encrypt the signal (step 520). The protocol/sequence controller 314 may command the encryption authentication circuit 318 to retrieve from database 320 the appropriate encryption key in response to the fob 102 mutual interrogation signal. The protocol/sequence controller 314 may then command the RFID reader 104 to provide the encrypted mutual interrogation signal to the fob 102 (step 522). The protocol/sequence controller 314 may command the authentication circuit 318 to provide an encrypted mutual interrogation signal for the fob 102 to mutually authenticate. Fob 102 may then receive the encrypted mutual interrogation signal and retrieve from authentication circuitry 212 a RFID reader decryption key.

Although an exemplary decision process of protocol/sequence controller 314 is described, it should be understood that a similar decision process may be undertaken by protocol/sequence controller 208 in controlling the components of fob 102. Indeed, as described above, protocol/sequence controller 314 may have similar operation and design as protocol/sequence controller 208. In addition, to the above, protocol/sequence controllers 208 and 314 may incorporate in the decision process appropriate commands for enabling USB interfaces 222 and 316, when the corresponding device is so connected.

Encryption/decryption component 318 may be further in communication with a secure account number database 320 which stores the security keys necessary for decrypting the encrypted fob account number. Upon appropriate request from protocol/sequence controller 314, encryption/decryption component (e.g., circuitry 318) may retrieve the appropriate security key, decrypt the fob account number and forward the decrypted account number to protocol sequence controller 314 in any format readable by any later connected POS device 110. In one exemplary embodiment, the account number may be forwarded in a conventional magnetic stripe format compatible with the ISO/IEC 7813 standard. Upon receiving the account number in magnetic stripe format, protocol/sequence controller 314 may forward the account number to POS device 110 via a communications interface 312 and data link 122, as best shown in FIG. 1. POS device 110 may receive the decrypted account number and forward the magnetic stripe formatted account number to a merchant network 112 for processing under the merchant's business as usual standard. In this way, the present invention eliminates the need of a third-party server. Further, where the POS device 110 receives a response from network 112 (e.g., transaction authorized or denied), protocol/sequence controller 314 may provide the network response to the RF module 302 for optically and/or audibly communicating the response to the fob 102 user.

RFID reader 104 may additionally include a USB interface 316, in communication with the protocol/sequence controller 314. In one embodiment, the USB interface may be a RS22 serial data interface. Alternatively, the RFID reader 104 may include a serial interface such as, for example, a RS232 interface in communication with the protocol/sequence controller 314. The USB connector 316 may be in communication with a personalization system (not shown) for initializing RFID reader 104 to system 100 application parameters. That is, prior to operation of system 100, RFID reader 104 may be in communication with a personalization system for populating database 310 with a listing of security keys belonging to authorized fobs 102, and for populating database 320 with the security keys to decrypt the fob 102 account numbers placing the account numbers in ISO/IEC 7813 format. In this way, RFID reader 104 may be populated with a unique identifier (e.g., serial number) which may be used by fob authentication circuitry 210 to determine if RFID reader 104 is authorized to receive a fob 102 encrypted account number.

Figure 6:
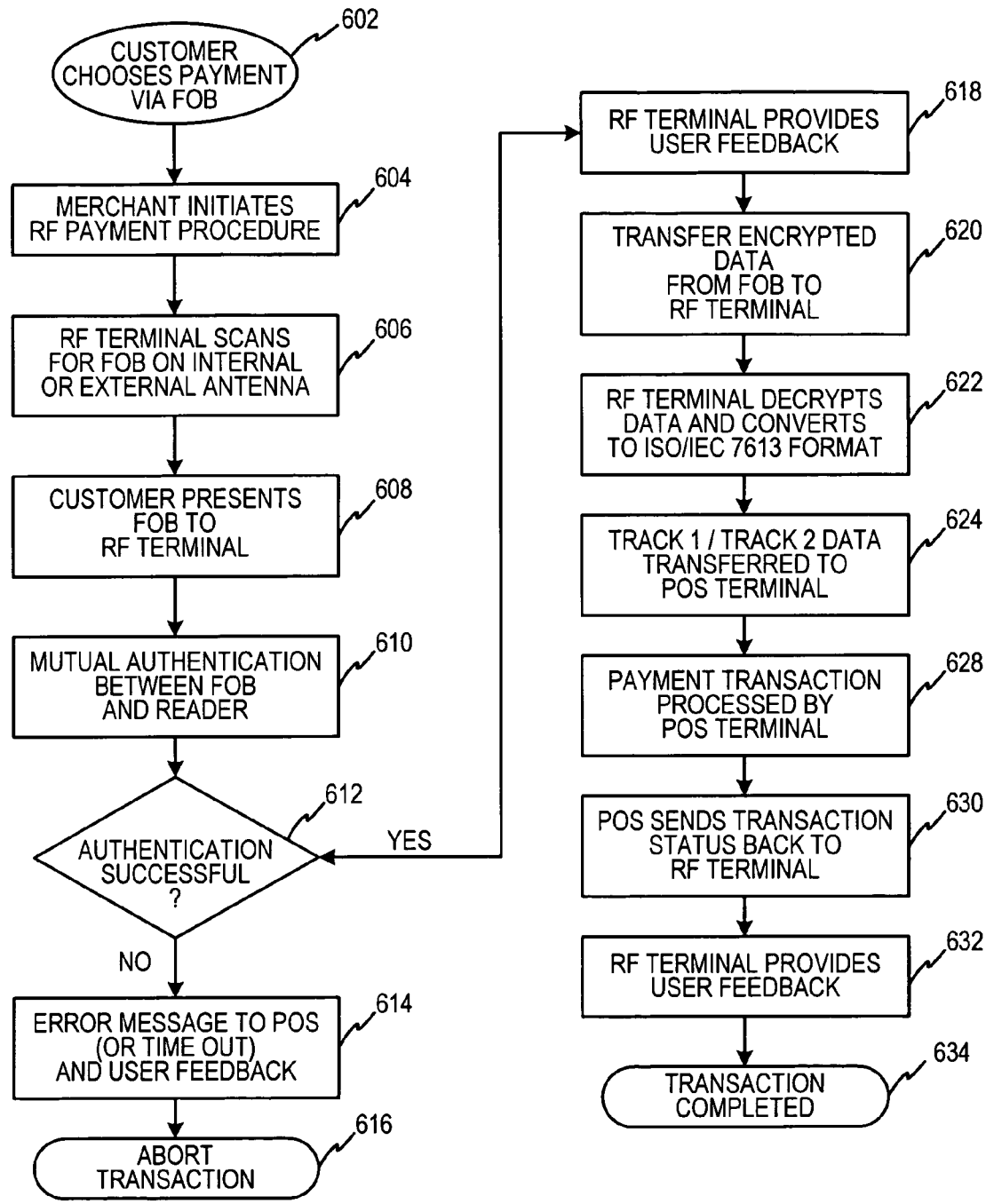
FIG. 6 is a flow diagram of an exemplary payment/transaction process in accordance with the present invention.

FIG. 6 illustrates an exemplary flow diagram for the operation of system 100, in accordance with the present invention. The operation may be understood with reference to FIG. 1, which depicts the elements of system 100 which may be used in an exemplary transaction. The process is initiated when a customer desires to present a fob 102 for payment (step 602). Upon presentation of the fob 102, the merchant initiates the RF payment procedure via an RFID reader 104 (step 604). In particular, the RFID reader sends out an interrogation signal to scan for the presence of fob 102 (step 606). The RF signal may be provided via the RFID reader antenna 106 or optionally via an external antenna 108. The customer then may present the fob 102 for payment (step 608) and the fob 102 is activated by the RF interrogation signal provided.

The fob 102 and the RFID reader 104 may then engage in mutual authentication (step 610). Where the mutual authentication is unsuccessful (step 612), an error message may be provided to the customer via the RFID optical and/or audible indicator (step 614) and the transaction may be aborted (step 616). Where the mutual authentication is successful (step 612), the RFID reader 104 may provide the customer with an appropriate optical and/or audible message (e.g., "transaction processing" or "wait") (step 618). The fob protocol/sequence controller 208 may then retrieve from database 214 an encrypted fob account number and provide the encrypted account number to the RFID reader 104 (step 620).

The account number may then be provided to the merchant system 130 for processing. In one exemplary embodiment, the RFID reader 104 may decrypt the account number and convert the account number into magnetic stripe (ISO/IEC 7813) format (step 622) prior to providing the account number to the merchant system 130 (step 628). In particular, the account number may be provided to the POS 110 device for transmission to the merchant network 112 for processing under known business transaction standards. The POS device 110 may then send an optical and/or audible transaction status message to the RFID reader 104 (step 630) for communication to the customer (step 632).

In another exemplary embodiment, the fob 102 may provide the account number to the merchant system 130 (step 624) in magnetic stripe format, so that the reader 104 does not need to convert the account number to magnetic stripe format. In this embodiment, the account number may or may not be encrypted prior to providing the account number to the merchant system for processing.

One key concern with providing an unencrypted account number to the merchant system 130 is that the unencrypted account number may be intercepted and later used to complete fraudulent transactions. As such, the present invention employs a proxy account number (e.g., proxy account identifier), which is provided to the merchant system 130 for transaction processing under the merchant business as usual standards (or with minimal changes or customizations). The proxy account identifier according to the present invention may be in similar format as is the account number so that the merchant system 130 is unaware that it is receiving proxy data. For example, if the account number is typically provided to the merchant system 130 in magnetic stripe format, then the proxy account identifier may also be in magnetic stripe format. It should be noted that the magnetic stripe format is discussed herein by way of example, and the present invention contemplates that the account number and the proxy account identifier may take any form recognizable by the merchant system 130.

As noted, the account number may ordinarily contain several portions reserved for predetermined information. For example, where the account number is in magnetic stripe format, the account number portions are governed by the International Standards Organization ISO/IEC 7811, et al. standard, which are hereby incorporated by reference. The standard requires the magnetic stripe information to be encoded in three "tracks," i.e., track 1, track 2, and track 3.

Data stored in track 1 is typically used to verify the user's identity. Track 1 may be reserved for encoding the transaction account identifier, the name of the account holder, and at least the expiration date of the transaction account or the transaction device. The information encoded in track 1 may be alphanumeric and may be encoded at about 7 Bits/Character. FIG. 7 illustrates an exemplary layout of the data stored in track 1, wherein track 1 is segmented into several distinct predetermined portions (e.g., "fields") for encoding the various account identifying information. The following table may be useful for determining the field definitions of the information provided.

TABLE 1

Table of Field Codes for Track 1

SS=Start Sentinel "%"
FC=Format Code
PAN=Primary Acct. # (19 digits max)
FS=Field Separator " "
Name=26 alphanumeric characters max.
Additional Data=Expiration Date, offset, encrypted PIN, etc.
ES=End Sentinel "?"
LRC=Longitudinal Redundancy Check Track 2 is the track most commonly used by the American Banking Association associated banking institutions. Track 2 is typically reserved for a duplicate version of the transaction account identifier and the expiration date of the transaction account or the transaction device stored in track 1. In addition, track 2 may include an encrypted Personal Identification Code, and other discretionary data. However, the data in track 2 is encoded at a lower Bit per Character density than the data encoded in track 1. The data in track 2 may be numeric only and may be encoded at about 5 Bits/Character. The lower density ratio in track 2 is designed to ensure compatibility with older technology readers and to provide redundancy when reading with newer technology readers. FIG. 8 illustrates an exemplary layout of the data stored in track 2, wherein track 2 is segmented into several distinct predetermined portions for encoding the various account identifying information. As shown, the following table may be useful for determining the definitions of the information provided.

TABLE 2

Table of Field Codes for Track 2

SS=Start Sentinel "%"
SS=Start Sentinel ";"
PAN=Primary Acct. # (19 digits max)
FS=Field Separator "="
Additional Data=Expiration Date, offset, encrypted PIN, etc.
ES=End Sentinel "?"
LRC=Longitudinal Redundancy Check Track 3 is of similar description as Track 2. With the International Standards Organization adoption of standard ISO/IEC 4909, track 3 of the magnetic stripe format was no longer used by the banking industry. However, other transaction devices including a magnetic stripe, such as drivers licenses, use track 3, which may include both numeric only and alpha numeric characters. Track 3 is unique in that track 3 was intended to have data read and WRITTEN on it. Cardholders would have account information UPDATED right on the magnetic stripe. Unfortunately, track 3 is almost an orphaned standard, since most readers currently in operation are not configured to write data onto a magnetic stripe. The original design of track 3 was to control off-line ATM transactions by recording transaction data for later reference by the banking institution. But since ATMs are now on-line, the usage of track 3 has been drastically reduced.

The most common technique used to encode data in magnetic stripe format is known as Aiken Biphase, or 'two-frequency coherent-phase encoding.' The American National Standards Institute (ANSI) and the International Standards Organization (ISO) have chosen two standards to guide the encoding process. The ISO encoding protocol specifies that each of tracks 1, 2 and 3 must begin and end with a length of all Zero bits, called CLOCKING BITS. These are used to synch the self-clocking feature of bi-phase decoding. In addition, most transaction devices which use magnetic stripe encoding protocol use either the ANSI/ISO ALPHA Data format or the ANSI/ISO BCD Data format. For example, track 1 is typically encoded in ANSI/ISO ALPHA Data format which is a 7 bit, 6 data bits+1 parity bit (odd) format, where the data is read least significant bit first. The ANSI/ISO ALPHA format character set contains 64 characters, 43 alphanumeric, 3 framing/field characters and 18 control/special characters. On the other hand, tracks 2 and 3 are typically encoded in ANSI/ISO BCD Data format, which is a 5 bit, 4 data bits+1 parity bit (odd) format. The character set for the ANSI/ISO BCD Data format character set contains 16 characters, 10 alphanumeric, 3 framing/field characters and 3 control/special characters.

The present invention takes advantage of the traditional encoding formats in the generation of the proxy transaction account identifier. In general, the proxy transaction account identifier is formatted using similar formatting as is used by the account provider such that the proxy account identifier emulates the account provider's preferred account identifier format. In the exemplary embodiment described herein, the proxy account identifier may be formatted using the encoding protocol and standards discussed above. The proxy account identifier may be encoded into "proxy tracks" 1, 2 and 3 according to the ISO/IEC 7811 et al. standard. The three separate portions or tracks 1, 2 and 3 are called "proxy tracks" 1, 2 and 3, herein for consistency with magnetic stripe terminology. However, the present invention contemplates that the proxy tracks are further segmented into sub-portions or subfields ("proxy fields") which are undetectable (or substantially undetectable) to the reader or the merchant system. For example, the proxy transaction account identifier may include three proxy tracks 1, 2, 3 of the magnetic stripe data which are encoded with a plurality of proxy fields without (or minimally) disturbing the manner in which the proxy tracks are received by the merchant system or reader. Each proxy field may have any field length as determined by the account provider so long as the proxy track containing the proxy fields meets the character bit density of the corresponding magnetic stripe track as defined by the magnetic stripe standard used by the account provider. The proxy fields in accordance with the present invention are shown as PF1-PFn shown in FIGS. 9 and 10.

Proxy tracks 1, 2, and 3 may be of similar description as traditional magnetic stripe tracks 1, 2, and 3 described above. As such, the information encoded in the proxy tracks ordinarily conforms to the American National Standards Institute and International Standards Organization noted above. That is, proxy tracks may be encoded with data using one of the ANSI/ISO ALPHA Data format or the ANSI/ISO BCD Data format.

The proxy tracks may be encoded with the relevant transaction account identifying data by the account provider. The encoding is preferably completed prior to populating the proxy account identifier into the fob database 214. The proxy account identifier may be provided to the fob database 214 prior to providing the fob 102 to an accountholder for usage. Alternatively, the fob 102 may add the proxy account identifier to the fob database 214 at a later date, for example, using the method described in the U.S. patent application Ser. No. 10/708,550 entitled "SYSTEMS AND METHODS FOR PROVIDING A RF TRANSACTION DEVICE OPERABLE TO STORE MULTIPLE DISTINCT ACCOUNT," which was filed on Mar. 10, 2004, and which is commonly owned by the assignee of the present invention and is hereby incorporated by reference.

The proxy account identifier is useful for securing the related account identifier, because only subparts or portions of the data sets encoded in the related account identifier are encoded in the proxy account identifier proxy tracks. The portions may be encrypted prior to providing the portions to the proxy track using any method as desired by the account provider. The portions of the account identifier which are encoded in the proxy tracks may be used by the account provider to regenerate the complete corresponding data set, for use in locating the corresponding transaction account for use in transaction completion. In this context, a data set may be groups of information. For example, one data set may be the account number, while anther data set may be the accountholder name, while yet another data set may be the transaction account expiration date, while still another data set may be the transaction account expiration date.

Figure 11:
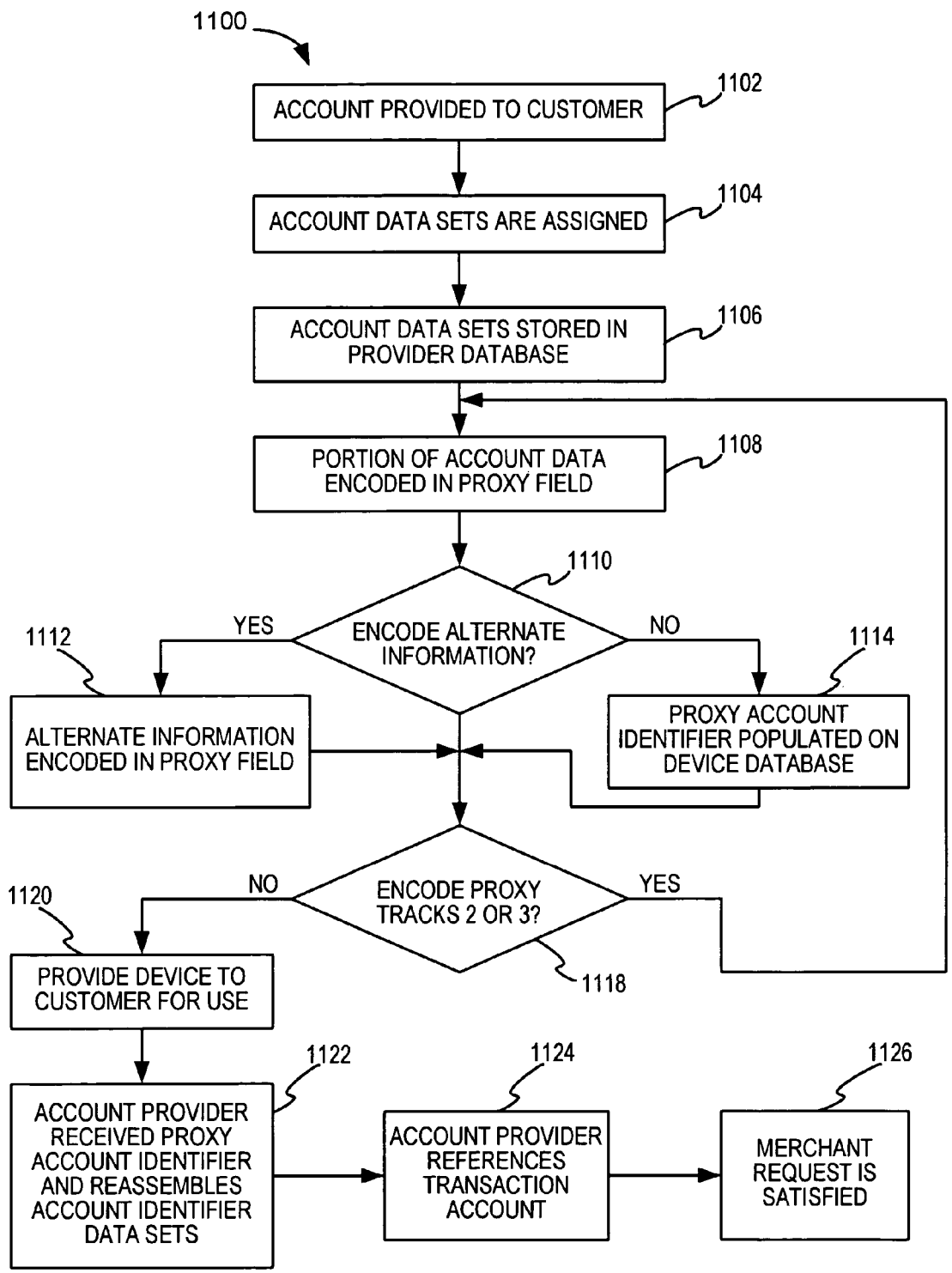
FIG. 11 is an illustration of an exemplary proxy transaction account identifier transaction, in accordance with an exemplary embodiment of the present invention.

A more complete understanding of method for encoding the portions of account identifier data into the proxy account identifier may be understood with reference to FIGS. 10, and 11, where FIG. 11 illustrates an exemplary method for encoding proxy account identifier track 1, which may be encoded using the ANSI/ISO ALPHA Data format.

An exemplary method for encoding the proxy tracks may begin with a customer opening a transaction account with a transaction account provider (step 1102). In opening the account, the customer provides the account provider with personal information such as, for example, the customer's name, street address, city and state. In other embodiments, the fob 102 may include other personal information, such as, for example, the customer's driver's license number, birth date, sex, height, weight, hair color, eye color, or the like.

Once the information is received, the account provider may open a transaction account and assign the transaction account a transaction account identifier and a transaction account expiration date or effective date (step 1104). The transaction account identifier, effective date, expirations date, and any other information provided by the customer or the account provider, which relates to the transaction account, may be stored on the provider system database such that each piece of information is correlated to the customer transaction account identifier (step 1106).

Ordinarily, the account provider may provide the customer with an account identifier associated with a transaction device using the information provided by the user and the information from the account provider. The account identifier may be in any format recognizable by the entity receiving the information. For example, where the account identifier is provided to a fob 102, the account identifier is ordinarily received by a reader 104 or merchant system 130. Consequently, the account identifier typically is configured in a format recognizable by the reader 104 or the merchant system 130.

In a banking context, the account identifier is formatted in accordance with the ANSI/ISO encoding standard. As such, the associated proxy account identifier will also employ the ANSI/ISO encoding standard, except that, as noted, the proxy account identifier only encodes portions of the information data sets that are encoded in the traditional account identifier.

For example, track 1 of the traditional account identifier is generally reserved for encoding the account number, expiration date and name of the accountholder (e.g., "customer"). That is, the full and complete data set encoded in traditional track 1 may include all characters which comprise a full data set of the traditional track 1 information. However, in accordance with the present invention, the proxy track 1 may only have portions of the traditional track 1 data set encoded in the proxy track 1 location. As noted, FIG. 11 illustrates an exemplary proxy track 1 layout, wherein the proxy fields (PF1-PFN) are shown.

Where the traditional track 1 may include a field PAN for encoding the transaction account number, proxy track 1 may only encode a predetermined portion of the account number therein (step 1108). The predetermined portion of the account number may be stored in a proxy field such as proxy field PF5. Thus, if the account number is a sixteen-digit credit card account number, the proxy field PF5 may have only the first eight digits of the account number (or any eight digits), thereby freeing up the remaining eight digit positions located in proxy field PF6 for use in storing alternate information. The account provider may then choose to encode any desired alternate information in the remaining digit positions at proxy field PF6 (step 1108). In one example, the account provider may encode authentication tag data, personal security data, customer health or demographic information or the like in proxy field PF6 (step 1112). In similar manner as is discussed with the account number, only portions of the alternate information may be encoded in proxy track 1 at proxy field PF6. Otherwise, the proxy account identifier is populated into the fob database 214.

The above process of encoding only portions of a data set may be repeated with respect to proxy track 2 and proxy track 3, if required (step 1116). Once the account provider encodes the desired information in the available proxy track character fields, the account provider may populate the proxy account identifier into a transaction device for use in completing a transaction (step 1114). For example, where fob 102 is the transaction device, the proxy account identifier may be populated on the fob database 214.

Ordinarily, the proxy account number (e.g., a portion of the transaction account number) includes essential identifying information, such as, for example, any information that is common to the account provider. The common information (also called "common character," herein) may include the account provider routing number, or common source indicator such as the character spaces reserved to indicate the identification of the issuing bank. Thus, where the proxy transaction account identifier corresponds to an American Express account, the proxy transaction account identifier may include the common character number 3, encoded the field location where such common character is ordinarily encoded in traditional magnetic stripe format.

FIG. 12 illustrates the encoding of which would ordinarily be done by an entity, such as, for example, MasterCard in track 2 format. FIG. 12 shows the encoding of a MasterCard account number 3111 2222 3333 4444 with expiration date December 1999 in traditional track 1 format. Since MasterCard uses the number 3 to identify its transaction accounts, the proxy account identifier will also use the number 3 so that the receiving system (e.g., reader 104 or merchant system 130, or account provider) further recognizes that the proxy account identifier is from a MasterCard transaction device. It should be noted that in this example, the "3" and the "101" may be common characters to all MasterCard transaction accounts.

FIG. 13 shows the identical account number, 3111 2222 3333 4444, encoded in the proxy account identifier proxy field PF3, which is reserved for account number data. The PF3 may only store the first four digits and the last four digits, or any combination which includes the common character of the issuing institution identifier the number 3. Thus, the remainder of the character locations (designated in PF4 by "*") for that account number location PAN is left for the account provider to store any information as desired.

Once the information is encoded in the transaction device (e.g., fob 102), the fob 102 may be presented for transaction completion using any method described herein (step 1120). For example, the merchant system 130 may receive the proxy transaction account identifier from the fob 102 in similar manner as was discussed with reference to completing a transaction in FIG. 6. The merchant system recognized the proxy transaction account identifier as referenced to a MasterCard account number because of the common number 3 and processes the proxy transaction account identifier under business as usual standards employed for MasterCard accounts.

Once a merchant transaction request is received at the account provider location, the account provider may decode the proxy transaction account identifier and reassemble the information contained in the proxy fields (step 1122). The account provider may reassemble or reconstruct the information using one or more account provider algorithms. The algorithms may be specific to a particular proxy field, or the algorithm may be operated on the entire proxy transaction account identifier. The reassembled data may be used to reference the corresponding transaction account on the account provider database for use in completing the transaction (step 1124). The account provider may then locate the appropriate corresponding account and satisfy the merchant transaction request under the account provider's business as usual standard (step 1126).

As such, it can be readily seen that the present invention has the added advantage over the prior art of being able to store more information in the same character spacing than is currently stored in a traditional track 1 field F3. In addition, the information may be transmitted in traditional magnetic stripe format without the disadvantage of engaging a third party to configure the information in a merchant recognizable format.

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. Thus, the preceding detailed description is presented for purposes of illustration only and not of limitation, and the scope of the invention is defined solely by the appended claims and their legal equivalents when properly read in light of the preceding description. For example, the steps recited in any of the method or process claims may be executed in any order and are not limited to the order presented.

We claim:

1. A payment system comprising:
    a transaction device system comprising:
        a transaction device associated with an account identifier, said account identifier including at least a first account identifier portion and a second account identifier portion,
        said transaction device further including a transaction device database including a proxy account identifier storage area operable for storing a proxy account identifier, said proxy account identifier including said first account identifier portion,
        said proxy account identifier storage area including a first proxy account identifier storage area and a second proxy account identifier storage area,
        said second proxy account identifier storage area configured to store at least said first account identifier portion, and
        said transaction device operable to provide said proxy account identifier including said first account identifier portion to an account identifier provider system; and
    said account identifier provider system in communication with said transaction device for receiving said proxy account identifier including said first account identifier portion,
    said account provider system operable to associate said first account identifier portion to said account identifier, said account identifier being associated with a transaction account, and
    said account identifier provider system operable to receive said first account identifier portion and provide the corresponding account identifier to an account identifier provider server for transaction completion.

2. A system according to claim 1, wherein said account identifier provider system is operable to provide said account identifier to said account identifier provider server in accordance with said first account identifier portion.

3. A system according to claim 2, wherein said account identifier provider system is operable to generate said second account identifier portion in accordance with a predetermined algorithm operated on said first account identifier portion, said account identifier provider system is operable to provide said account identifier to said account identifier provider server in accordance with said first account identifier portion and said generated second account identifier portion.

4. A system according to claim 2, wherein said account identifier provider system further includes an account identifier provider database, said account identifier provider database operable to store said account identifier, wherein said account identifier provider system is operable to locate said stored account identifier in accordance with a predetermined algorithm operated on said first account identifier portion.

5. A system according to claim 2, wherein said account identifier provider system further includes an account identifier provider database, said account identifier provider database operable to store said second account identifier portion, wherein said account identifier provider system is operable to locate said stored second account identifier portion in accordance with a predetermined algorithm operated on said first account identifier portion, said account identifier provider system is operable to provide said account identifier to said account identifier provider server in accordance with said first account identifier portion and said located second account identifier portion.

6. A system according to claim 1, further including a merchant system in communication with said transaction device system, said transaction device system operable to provide said proxy account identifier to said merchant system, said merchant system in further communication with said account identifier provider system, said merchant system operable to provide said proxy account identifier including said first account identifier portion to said account identifier provider system.

7. A system according to claim 6, wherein said transaction device system is operable to provide said proxy account identifier in a merchant system recognizable format.

8. A system according to claim 6, further comprising a transaction device reader in communication with said transaction device system, said transaction device reader in further communication with said merchant system, said transaction device reader operable to receive said proxy account identifier and to provide said proxy account identifier to said merchant system.

9. A system according to claim 7, wherein said proxy account identifier is in International Standards Organization (ISO) compatible magnetic stripe format.

10. A system according to claim 7, wherein said proxy account identifier includes said first account identifier portion in at least one track of an ISO compatible magnetic stripe format.

11. A system according to claim 1, wherein said transaction device is operable to provide said proxy account identifier including said first account identifier portion to said account identifier provider system in a contactless transmission medium.

12. A system according to claim 11, wherein said contactless transmission medium is radio frequency.

13. A method of transmitting data for transaction completion in a payment system, said method comprising:

providing a transaction device associated with a proxy account identifier, said proxy account identifier having at least a first proxy account identifier portion;

providing a database for storing said proxy account identifier;

associating said first proxy account identifier portion with a transaction account identifier, said transaction device identifier including first and second transaction account identifier portions;

storing said first transaction account identifier portion in said first proxy account identifier portion; and providing said first transaction account identifier portion to a transaction account provider for use in determining said transaction account identifier for use in completing a transaction.

14. A method according to claim 13, wherein said proxy account identifier is in International Standards Organization (ISO) compatible magnetic stripe format.

15. A method according to claim 13, wherein said proxy account identifier includes said first account identifier portion in at least one track of an ISO compatible magnetic stripe format.

* * * * *